(12) United States Patent
Morooka

(10) Patent No.: US 7,450,316 B2
(45) Date of Patent: Nov. 11, 2008

(54) ZOOM LENS SYSTEM AND IMAGE PICKUP APPARATUS USING THE SAME

(75) Inventor: Masaru Morooka, Akishima (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 11/901,681

(22) Filed: Sep. 17, 2007

(65) Prior Publication Data

US 2008/0100923 A1    May 1, 2008

(30) Foreign Application Priority Data

Oct. 31, 2006  (JP) .............................. 2006-295275

(51) Int. Cl.
*G02B 15/14* (2006.01)
*G02B 3/02* (2006.01)
*G02B 9/34* (2006.01)

(52) U.S. Cl. ..................... 359/687; 359/686; 359/774; 359/715

(58) Field of Classification Search ................ 359/676, 359/683, 686, 687, 8, 715, 771, 772, 774, 359/776

See application file for complete search history.

(56) References Cited

U.S. PATENT DOCUMENTS

| 5,570,233 | A | 10/1996 | Mihara et al. |
| 5,572,277 | A | 11/1996 | Uzawa et al. |
| 6,462,886 | B1 | 10/2002 | Hagimori |
| 6,924,938 | B2 * | 8/2005 | Nishina et al. ............... 359/687 |
| 7,167,320 | B2 | 1/2007 | Ohashi |

FOREIGN PATENT DOCUMENTS

| JP | 08-050244 | 2/1996 |
| JP | 2005-017915 | 1/2005 |
| JP | 2006-78979 | 3/2006 |

* cited by examiner

*Primary Examiner*—William C. Choi
*Assistant Examiner*—Jack Dinh
(74) *Attorney, Agent, or Firm*—Kenyon & Kenyon LLP

(57) ABSTRACT

A zoom lens system comprises, in order from an object side, a first lens unit having a positive refractive power, a second lens unit having a negative refractive power, a third lens unit having a positive refractive power and a fourth lens unit having a positive refractive power, during zooming from a wide-angle end to a telephoto end, at least the first lens unit and the third lens unit are moved toward the object side so as to increase a space between the first lens unit and the second lens unit and decrease a space between the second lens unit and the third lens unit, and predetermined conditions are satisfied.

26 Claims, 12 Drawing Sheets

ZOOM LENS SYSTEM AND IMAGE PICKUP APPARATUS USING THE SAME

CROSS REFERENCE TO RELATED APPLICATIONS

This application claims benefit under 35 U.S.C. §119 of Japanese patent application of No. 2006-295,275 filed in Japan on Oct. 31, 2006, the contents of which are incorporated herein by reference.

BACKGROUND OF THE INVENTION

1. Field of the Invention

The present invention relates to a zoom lens system and an image pickup apparatus using the same.

2. Description of the Related Art

In recent years, instead of a silver halide film camera, a digital camera has been a mainstream which photographs a subject by use of an electronic image pickup device such as a CCD image sensor or a CMOS type image sensor. Furthermore, the camera has been used in a large number of categories in a broad range from a highly functional type for business to a compact popular type. A user of the popular type of digital camera would like a small-sized camera, especially a digital camera of a thin type which is conveniently carried with a good storage property in clothing, a bag pocket or the like and which has a small size in a thickness direction.

On the other hand, a zoom ratio of a photographing lens has been generally about three, but there is a demand for a camera having a high zoom ratio and capable of photographing with a large angle of view in order to satisfy users' broad needs.

The photographing lens for such a camera needs to be miniaturized so that portability of the camera is not impaired.

A zoom lens system having a large zoom ratio and a large angle of view of 70° or more in a wide-angle end is disclosed in the following documents 1) to 7).

To thin the camera, a lens barrel of the photographing lens needs to be thinned. As means for thinning the photographing lens, a so-called collapsible lens barrel has been generalized which is projected from a camera body at a time when the camera has a photographing state and which is stored in the camera body when carried. Therefore, it is important to form a zoom lens system in consideration of the thinning of the collapsed lens barrel. Specifically, to reduce the thickness of the lens barrel when collapsed, each lens unit of the zoom lens system needs to include less lenses, and a total length of the zoom lens system needs to be shortened.

1) Japanese Patent Application Laid-Open No. 7-5,361
2) Japanese Patent Application Laid-Open No. 7-20,381
3) Japanese Patent Application Laid-Open No. 8-50,244
4) Japanese Patent Application Laid-Open No. 2001-350,092
5) Japanese Patent Application Laid-Open No. 2005-17,915
6) Japanese Patent Application Laid-Open No. 2006-78,979
7) Japanese Patent Application Laid-Open No. 2006-235,062

BRIEF SUMMARY OF THE INVENTION

The present invention is directed to a zoom lens system having a large zoom ratio and a large angle of view which comprises, in order from an object side: a first lens unit having a positive refractive power; a second lens unit having a negative refractive power; a third lens unit having a positive refractive power; and a fourth lens unit having a positive refractive power.

During zooming from a wide-angle end to a telephoto end, at least the first lens unit and the third lens unit are moved toward the object side so as to increase a space between the first lens unit and the second lens unit and decrease a space between the second lens unit and the third lens unit.

Moreover, in one aspect, the zoom lens system satisfies the following conditions:

$$35° < \tan^{-1}(I/f_w) \qquad (1);$$

$$5 < (f_t/f_w) \qquad (2);$$

$$0.5 < f_{g1}/f_t < 1.35 \qquad (3);$$

$$0.4 < |f_{g2}/f_{g3}| < 1 \qquad (4); \text{ and}$$

$$0.5 < (M_{2gt}/M_{2gw})/(M_{3gt}/M_{3gw}) < 1.3 \qquad (5),$$

in which $f_w$ is a focal length of the zoom lens system in the wide-angle end, $f_t$ is a focal length of the zoom lens system in the telephoto end, I is a maximum image height of a formed image, $f_{g1}$ is a focal length of the first lens unit, $f_{g2}$ is a focal length of the second lens unit, $f_{g3}$ is a focal length of the third lens unit, $M_{2gw}$ is a lateral magnification of the second lens unit in the wide-angle end, $M_{2gt}$ is a lateral magnification of the second lens unit in the telephoto end, $M_{3gw}$ is a lateral magnification of the third lens unit in the wide-angle end, and $M_{3gt}$ is a lateral magnification of the third lens unit in the telephoto end.

Moreover, according to another aspect, in the zoom lens system, the first lens unit includes, in order from the object side, a negative lens and a positive lens in which a curvature of the object-side surface is larger than that of an image-side surface, and the following conditions are satisfied:

$$35° < \tan^{-1}(I/f_w) \qquad (1);$$

$$5 < (f_t/f_w) \qquad (2);$$

$$0.5 < f_{g1}/f_t < 1.35 \qquad (3); \text{ and}$$

$$-1.5 < (R_{plf} + R_{plr})/(R_{plf} - R_{plr}) < -0.75 \qquad (7),$$

in which $f_w$ is a focal length of the zoom lens system in the wide-angle end, $f_t$ is a focal length of the zoom lens system in the telephoto end, I is a maximum image height of a formed image, $f_{g1}$ is a focal length of the first lens unit, $R_{plf}$ is a radius of curvature of the object-side surface of the positive lens of the first lens unit, and $R_{plr}$ is a radius of curvature of the image-side surface of the positive lens of the first lens unit.

An image pickup apparatus according to the present invention comprises the zoom lens system according to the present invention, and an image pickup device which is disposed on an image side of the zoom lens system and which converts an optical image into an electric signal.

Other features and advantages of the present invention will become apparent from the following detailed description of the embodiments when taken in conjunction with the accompanying drawings and appended claims.

BRIEF DESCRIPTION OF THE DRAWINGS

The present invention will become more fully understood from the detailed description given below and the accompanying drawings, which are given by way of illustration only and thus are not limitative of the present invention, wherein:

FIG. 1A is a sectional view of the system in a wide-angle end, FIG. 1B is a sectional view of the system in an intermediate position, and FIG. 1C is a sectional view of the system in a telephoto end;

FIG. 2A is a sectional view of the system in a wide-angle end, FIG. 2B is a sectional view of the system in an intermediate position, and FIG. 2C is a sectional view of the system in a telephoto end;

FIG. 3A is a sectional view of the system in a wide-angle end, FIG. 3B is a sectional view of the system in an intermediate position, and FIG. 3C is a sectional view of the system in a telephoto end;

FIG. 4A is a sectional view of the system in a wide-angle end, FIG. 4B is a sectional view of the system in an intermediate position, and FIG. 4C is a sectional view of the system in a telephoto end;

FIG. 5A shows a state of the wide-angle end, FIG. 5B shows a state of the intermediate position, and FIG. 5C shows a state of the telephoto end;

FIG. 6A shows a state of the wide-angle end, FIG. 6B shows a state of the intermediate position, and FIG. 6C shows a state of the telephoto end;

FIG. 7A shows a state of the wide-angle end, FIG. 7B shows a state of the intermediate position, and FIG. 7C shows a state of the telephoto end;

FIG. 8A shows a state of the wide-angle end, FIG. 8B shows a state of the intermediate position, and FIG. 8C shows a state of the telephoto end;

DETAILED DESCRIPTION OF THE PREFERRED EMBODIMENTS

Figure 1A:
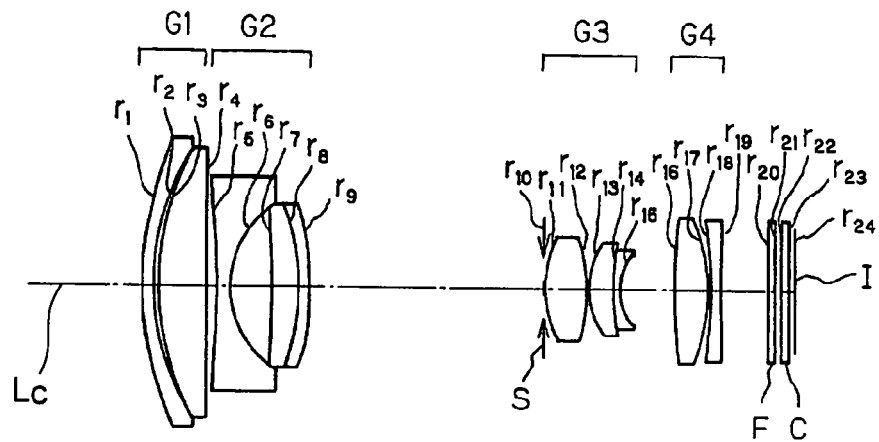
FIGS. 1A to 1C are sectional views of Example 1 of a zoom lens system including an optical axis according to the present invention when focused at infinity.

As described above, according to the present invention, a zoom lens system comprises, in order from an object side, a first lens unit having a positive refractive power; a second lens unit having a negative refractive power; a third lens unit having a positive refractive power; and a fourth lens unit having a positive refractive power.

During zooming from a wide-angle end to a telephoto end, at least the first lens unit and the third lens unit are moved toward the object side so as to increase a space between the first lens unit and the second lens unit and decrease a space between the second lens unit and the third lens unit.

In the zoom lens system including the first lens unit having the positive refractive power, the first lens unit having the positive refractive power is disposed close to the second lens unit in the wide-angle end, and the first and second lens units are moved so as to enlarge the space between the first lens unit and the second lens unit during the zooming to the telephoto end to perform the zooming.

To obtain a high zoom ratio, the space between the first lens unit and the second lens unit has to be enlarged. When the first lens unit is fixed and the second lens unit only is moved to perform the zooming, a space between the first lens unit and an aperture stop increases, and a lens diameter of the first lens unit increases.

To prevent this, during the zooming, the first lens unit is moved toward the object side, and the space between the first lens unit and the second lens unit is secured in the telephoto end. In consequence, the first lens unit can be positioned closer to an image side in the wide-angle end. Therefore, the space between the first lens unit and the aperture stop can be reduced to reduce the diameter of the first lens unit.

Moreover, during the zooming to the telephoto end, the third lens unit is moved toward the object side so as to reduce the space between the second lens unit and the third lens unit. In consequence, a zooming function can be shared by the third lens unit.

Therefore, a change amount of the space between the first lens unit and the second lens unit during the zooming can be reduced. At this time, it is preferable to move the third lens unit toward the object side so as to increase a space between the third lens unit and the fourth lens unit.

According to such a constitution, a movement amount of each lens unit during the zooming is reduced, an aberration fluctuation during the zooming is reduced, and a satisfactory aberration performance in the whole zoom region can be secured.

Next, numerical conditions will be described.

Condition (1) indicates an angle of view of the zoom lens system. If $\tan^{-1}(1/f_w)$ is below a lower limit of 35° in the condition (1), the angle of view in the wide-angle end narrows.

Condition (2) indicates a zoom ratio of the zoom lens system. If $(f_t/f_w)$ is below a lower limit of 5 in the condition (2), the zoom ratio decreases.

Condition (3) appropriately defines the refractive power of the first lens unit. If $f_{g1}/f_t$ is above an upper limit of 1.35 in the condition (3), the refractive power of the first lens unit excessively decreases, and the refractive power of the second lens unit relatively also weakens. In this case, since the movement amount of the second lens unit increases, the first lens unit is relatively positioned closer to the object side in the wide-angle end. Therefore, the diameter of the first lens unit increases, and it becomes difficult to secure compactness. At this time, since the refractive power of the third lens unit is inevitably strengthened in order to obtain a sufficient zooming function, aberrations generated in the third lens unit increase. Therefore, it is difficult to obtain a satisfactory image forming performance.

If $f_{g1}/f_t$ is below a lower limit of 0.5 in the condition (3), the refractive power of the first lens unit excessively increases, and it is difficult to correct a spherical aberration especially in the wide-angle end.

Condition (4) appropriately defines a ratio between the refractive powers of the second lens unit and the third lens unit. If $|f_{g2}/f_{g3}|$ is above an upper limit of 1 in the condition (4), a focal length of the second lens unit increases, and a movement amount during the zooming increases. Therefore, the total length of the zoom lens system increases. At this time, since the refractive power of the third lens unit has to be relatively strengthened, the aberrations generated in the third lens unit increase and it is difficult to obtain a satisfactory image forming performance.

If $|f_{g2}/f_{g3}|$ is below a lower limit of 0.4 in the condition (4), the refractive power of the second lens unit excessively increases, the aberrations generated in the second lens unit increase, and the aberration fluctuations during the zooming increase.

Condition (5) appropriately defines sharing of the zooming function between the second lens unit and the third lens unit during the zooming from the wide-angle end to the telephoto end. If $(M_{2gt}/M_{2gw})/(M_{3gt}/M_{3gw})$ is above an upper limit of 1.3 in the condition (5), a burden of the zooming function on the second lens unit increases, and a movement amount of the second lens unit increases. Therefore, an increase of the total length of the zoom lens system and an increase of a lens diameter of the first lens unit are caused.

If $(M_{2gt}/M_{2gw})/(M_{3gt}/M_{3gw})$ is below a lower limit of 0.5 in the condition (5), the burden of the zooming function on the third lens unit increases, and the movement amount of the third lens unit increases. Therefore, the F number in the telephoto end increases, and a fluctuation amount of an incidence angle of a ray on an image pickup device increases during the zooming. Since the refractive power of the third lens unit excessively increases and the aberrations generated in the third lens unit increase, it is difficult to obtain a satisfactory image forming performance.

Condition (7) defines a shape of the positive lens of the first lens unit. To achieve the miniaturization and the high zoom ratio, the first lens unit is require to have a large positive power. To correct the generated aberrations with good balance between an object-side surface and an image-side surface, a shape which satisfies the condition (7) is effective.

If $(R_{plf}+R_{plr})/(R_{plf}-R_{plr})$ is above an upper limit of $-0.75$ in the condition (7), this is disadvantageous in correction of an aberration such as a curvature of field generated on the image-side surface of the lens in the wide-angle end. On the other hand, a value below a lower limit of $-1.5$ is disadvantageous for the correction of the spherical aberration. Since a principal point of the first lens unit is positioned closer to the object side, a space between the principal point of the first lens unit and a principal point of the second lens unit enlarges in the wide-angle end. Therefore, if a desired angle of view is secured, a ray height increases. If a necessary thickness of an edge of the lens is secured, an axial thickness remarkably increases, and it is difficult to miniaturize the system.

It is more preferable that the zoom lens system satisfies the following condition:

$$0.5 < C_{jt}/f_t < 1.8 \quad (6),$$

in which $C_{jt}$ is a distance from an incidence surface of the zoom lens system to an image position in the telephoto end along the optical axis.

The condition (6) defines a ratio between the total length and the focal length of the zoom lens system in the telephoto end. If $C_{jt}/f_t$ is above an upper limit of 1.8 in the condition (6) and the zoom ratio is enlarged, the total length of the lenses in the telephoto end increases. This cannot achieve a compact lens barrel. If $C_{jt}/f_t$ is below a lower limit of 0.5 in the condition (6), the total length of the zoom lens system in the telephoto end decreases even in a case where the zoom ratio increases. However, since the refractive power of each lens unit increases, the aberration fluctuations during the zooming increase.

Regarding the first lens unit, it is preferable that the first lens unit includes, in order from the object side, a negative lens and a positive lens in which a curvature of the object-side surface is larger than that of the image-side surface.

When the first lens unit satisfies the condition (3) and includes one negative lens and one positive lens, a chromatic aberration and the like generated in the first lens unit can be reduced, and the aberration fluctuations during the zooming can be reduced. Since the number of the lenses is small, a size of the first lens unit can be reduced and the lens barrel can be miniaturized.

Regarding the second lens unit, it is preferable that the second lens unit includes, in order from the object side, three lenses including a negative lens, a positive lens and a negative lens and that the negative lens closest to the object side has an aspherical surface on at least one surface.

The second lens unit is a lens unit which shares the zooming function. Therefore, in respect of an optical performance, it is important to constitute an optical lens arrangement at a time when the number of the lenses of the second lens unit is limited to three. When two negative lenses are arranged in the second lens unit, the negative power can be shared, and excessive generations of the aberrations can be avoided. When the negative lens, the positive lens and the negative lens are arranged in this order from the object side, symmetry of a lens constitution improves, and the aberration can efficiently be corrected in the second lens unit Moreover, when the aspherical, surface is used on at least one surface of the negative lens of the second lens unit closest to the object side, generations of the spherical aberration and a coma can be reduced, the generation of the aberration in the second lens unit can be suppressed and a satisfactory optical performance can be obtained.

When one of the conditions (3) to (5) is deformed as represented by the following (3)' to (5)', further miniaturization and higher performance can be achieved.

$$0.6 < f_{g1}/f_t < 1.2 \quad (3)';$$

$$0.5 < |f_{g2}/f_{g3}| < 1 \quad (4)'; \text{ and}$$

$$0.5 < (M_{2gt}/M_{2gw})/(M_{3gt}/M_{3gw}) < 1.2 \quad (5)'.$$

Moreover, it is preferable that the lens of the zoom lens system closest to the image side is a negative lens in which the curvature of the object-side surface is larger than that of the image-side surface. In this case, the lens closest to the image side has a symmetric constitution with the negative lens of the first lens unit closest to the object side with respect to the aperture stop. This constitution is preferable for the correction of the aberration, especially the curvature of field in the zoom lens system.

In the zoom lens system, it is preferable to perform focusing with the fourth lens unit.

When the above zoom lens system is used as a photographing lens of an image pickup apparatus, it is preferable to arrange an image pickup device which converts an optical image into an electric signal on the image side of the zoom lens system.

In this case, it is preferable to arrange a low pass filter between the zoom lens system and the image pickup device.

Next, numerical examples of the zoom lens system will be described.

FIGS. 1A to 4C are sectional views of Examples 1 to 4 including an optical axis when focused at infinity. FIGS. 1A, 2A, 3A and 4A show sectional views in the wide-angle end, FIGS. 1B, 2B, 3B and 4B show sectional views in the intermediate position, and FIGS. 1C, 2C, 3C and 4C show sectional views in the telephoto end, respectively. In the drawings, a first lens unit is denoted with G1, a second lens unit is denoted with G2, an aperture stop is denoted with S, a third lens unit is denoted with G3, a fourth lens unit is denoted with G4, a fifth lens unit is denoted with G5, an optical low pass filter is denoted with F, cover glass of a CCD image sensor as an electronic image pickup device is denoted with C, and an image surface is denoted with I. An image pickup surface of the CCD image sensor is arranged on the image surface I. It is to be noted that, to remove an infrared ray, the optical low pass filter F may directly be provided with a near infrared ray sharp cut coating. Alternatively, an infrared cut absorption filter may separately be arranged, or a transparent flat plate provided with the near infrared ray sharp cut coating on an incidence surface thereof may be used.

Figure 1B:
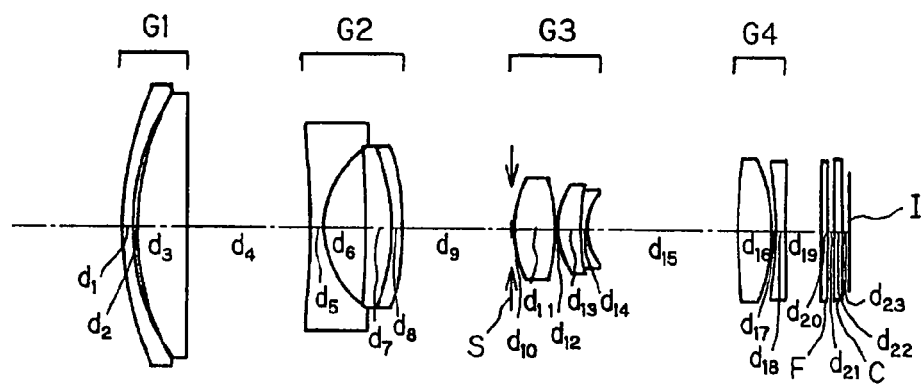
Figure 1C:
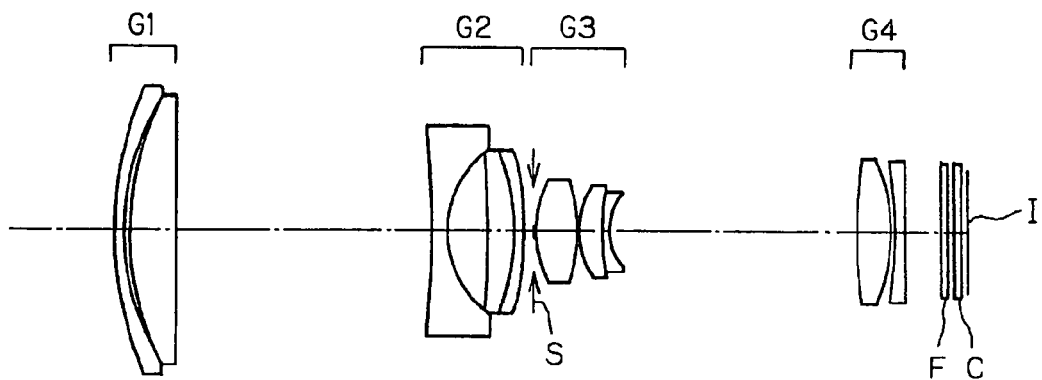

As shown in FIGS. 1A to 1C, Example 1 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power. During zooming from a wide-angle end to a telephoto end, the first lens unit G1 moves toward the object side, and the second lens unit G2 moves toward an image side. The aperture stop S and the third lens unit G3 integrally move toward the object side, and the fourth lens unit G4 moves along a track being convex toward the image side while enlarging a space between the fourth lens unit and the third lens unit G3, and is positioned closer to the image-side in the telephoto end than in the wide-angle end.

The first lens unit G1 includes a negative meniscus lens whose convex surface faces the object side and a positive meniscus lens whose convex surface faces the object side in order from the object side. The second lens unit G2 includes, in order from the object side, a double-concave negative lens, and a cemented lens including a positive meniscus lens whose convex surface faces the image side and a negative meniscus lens whose convex surface faces the image side. The third lens unit G3 includes, in order from the object side, a double-convex positive lens, and a cemented lens including a positive meniscus lens whose convex surface faces the object side and a negative meniscus lens whose convex surface faces the object side. The fourth lens unit G4 includes, in order from the object side, a double-convex positive lens and a double-concave negative lens.

Aspherical surfaces are used on six surfaces including opposite surfaces of the double-concave negative lens of the second lens unit G2, the surface of the cemented lens of the second lens unit closest to the image side, opposite surfaces of the double-convex positive lens of the third lens unit G3 and an object-side surface of the double-convex positive lens of the fourth lens unit G4.

Figure 2A:
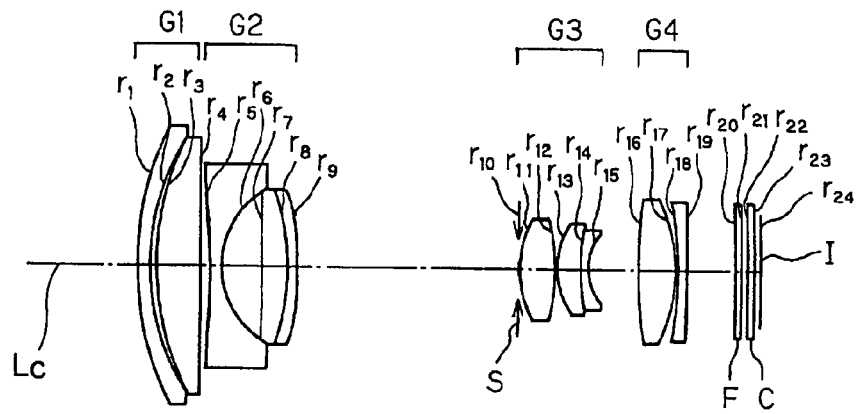
FIGS. 2A to 2C are sectional views of Example 2 of the zoom lens system including the optical axis according to the present invention when focused at infinity.
Figure 2B:
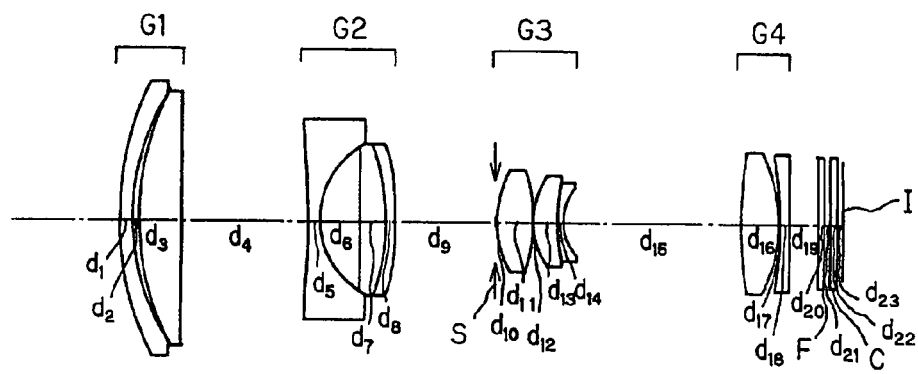
Figure 2C:
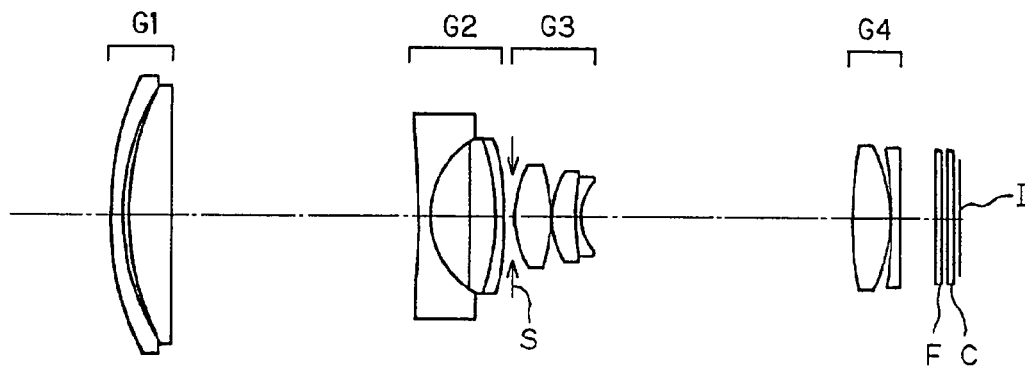

As shown in FIGS. 2A to 2C, Example 2 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power. During zooming from a wide-angle end to a telephoto end, the first lens unit G1 moves toward the object side, and the second lens unit G2 moves along a track being convex toward the image side while enlarging a space between the second lens unit and the first lens unit G1, and is positioned closer to the image side in the telephoto end than in the wide-angle end. The aperture stop S and the third lens unit G3 integrally move toward the object side while reducing a space between the third lens unit and the second lens unit G2, and the fourth lens unit G4 moves along a track being convex toward the image side while enlarging a space between the fourth lens unit and the third lens unit G3, and is positioned closer to the image side in the telephoto end than in the wide-angle end.

The first lens unit G1 includes, in order from the object side, a negative meniscus lens whose convex surface faces the object side and a double-convex positive lens. The second lens unit G2 includes, in order from the object side, a double-concave negative lens, and a cemented lens constituted by cementing a positive meniscus lens whose convex surface faces the image side and a negative meniscus lens whose convex surface faces the image side. The third lens unit G3 includes, in order from the object side, a double-convex positive lens, and a cemented lens constituted by cementing a positive meniscus lens whose convex surface faces the object side and a negative meniscus lens whose convex surface faces the object side. The fourth lens unit G4 includes, in order from the object side, a double-convex positive lens and a double-concave negative lens.

Aspherical surfaces are used on six surfaces including opposite surfaces of the double-concave negative lens of the second lens unit G2, the surface of the cemented lens of the second lens unit closest to the image side, opposite surfaces of the double-convex positive lens of the third lens unit G3 and an object-side surface of the double-convex positive lens of the fourth lens unit G4.

Figure 3A:
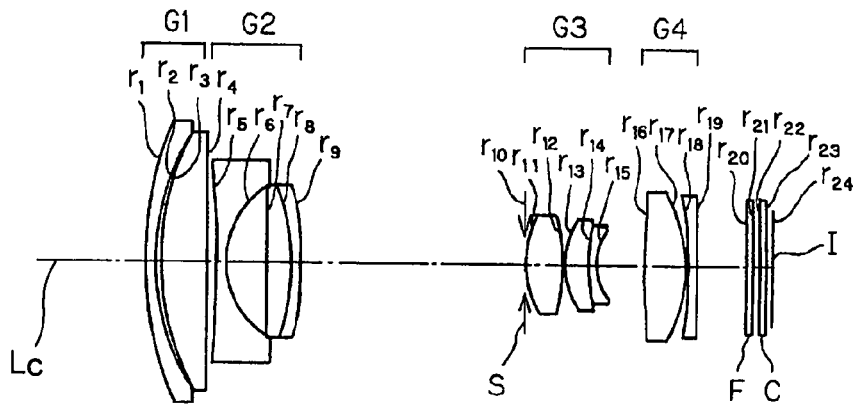
FIGS. 3A to 3C are sectional views of Example 3 of the zoom lens system including the optical axis according to the present invention when focused at infinity.
Figure 3B:
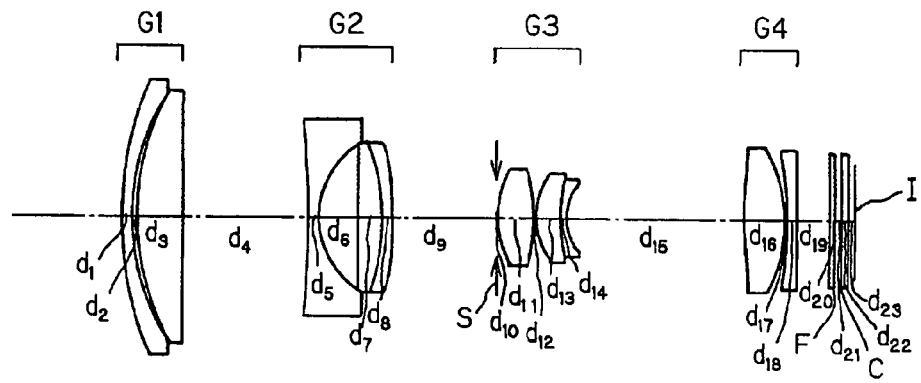
Figure 3C:
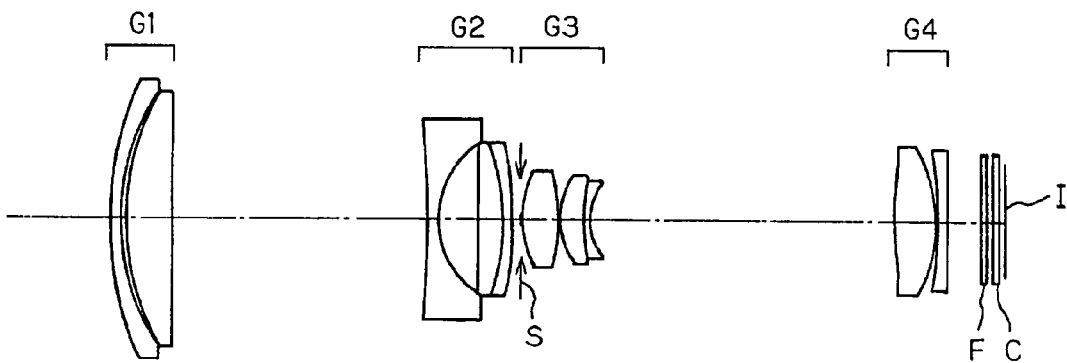

As shown in FIGS. 3A to 3C, Example 3 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power. During zooming from a wide-angle end to a telephoto end, the first lens unit G1 moves toward the object side, and the second lens unit G2 moves along a track being convex toward the image side while enlarging a space between the second lens unit and the first lens unit G1, and is positioned closer to the object side in the telephoto end than in the wide-angle end. The aperture stop S and the third lens unit G3 integrally move toward the object side while reducing a space between the third lens unit and the second lens unit G2, and the fourth lens unit G4 moves along a track being convex toward the image side while enlarging a space between the fourth lens unit and the third lens unit G3, and is positioned closer to the image side in the telephoto end than in the wide-angle end.

The first lens unit G1 includes, in order from the object side, a negative meniscus lens whose convex surface faces the object side and a positive meniscus lens whose convex surface faces the object side. The second lens unit G2 includes, in order from the object side, a double-concave negative lens, and a cemented lens constituted by cementing a positive meniscus lens whose convex surface faces the image side and a negative meniscus lens whose convex surface faces the image side. The third lens unit G3 includes, in order from the object side, a double-convex positive lens, and a cemented lens constituted by cementing a positive meniscus lens whose convex surface faces the object side and a negative meniscus lens whose convex surface faces the object side. The fourth lens unit G4 includes, in order from the object side, a double-convex positive lens and a double-concave negative lens.

Aspherical surfaces are used on seven surfaces including opposite surfaces of the double-concave negative lens of the second lens unit G2, the surface of the cemented lens of the second lens unit closest to the image side, opposite surfaces of the double-convex positive lens of the third lens unit G3 and opposite surfaces of the double-convex positive lens of the fourth lens unit G4.

Figure 4A:
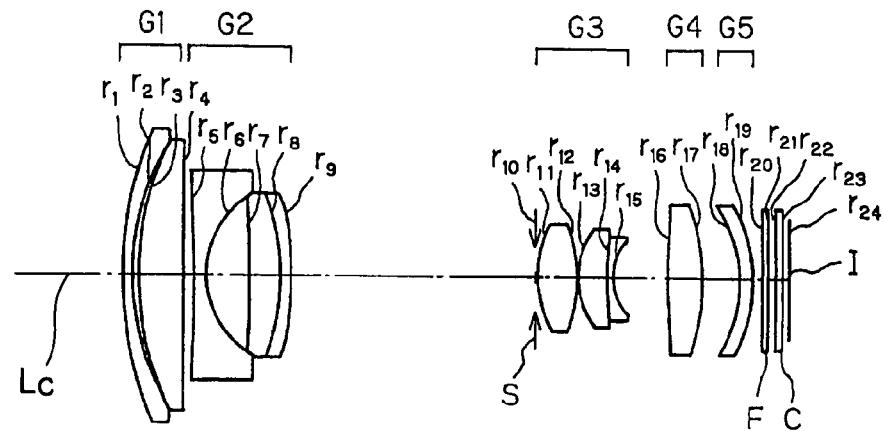
FIGS. 4A to 4C are sectional views of Example 4 of the zoom lens system including the optical axis according to the present invention when focused at infinity.
Figure 4B:
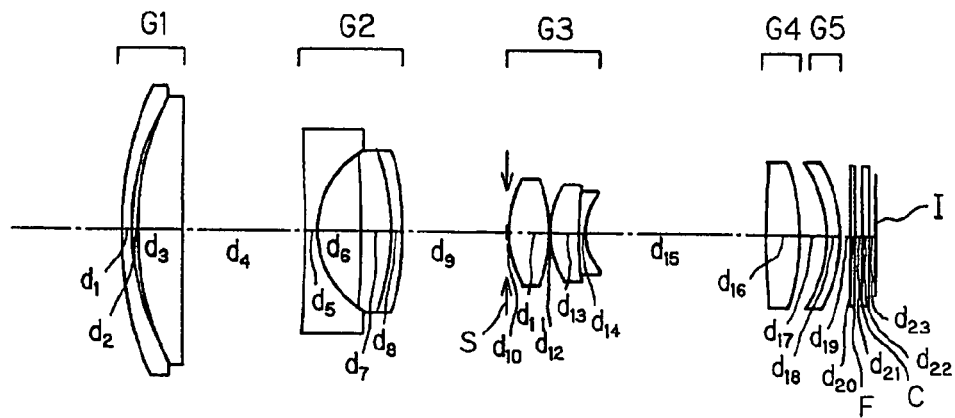
Figure 4C:
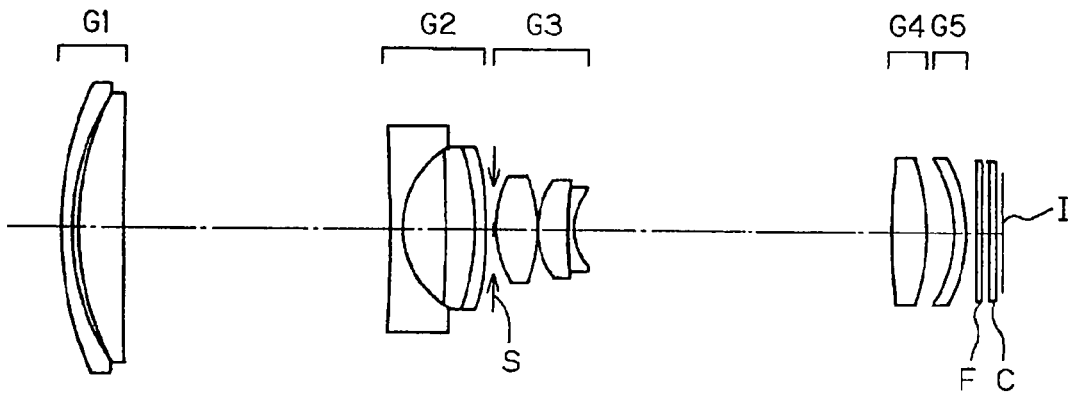
Figure 5A:
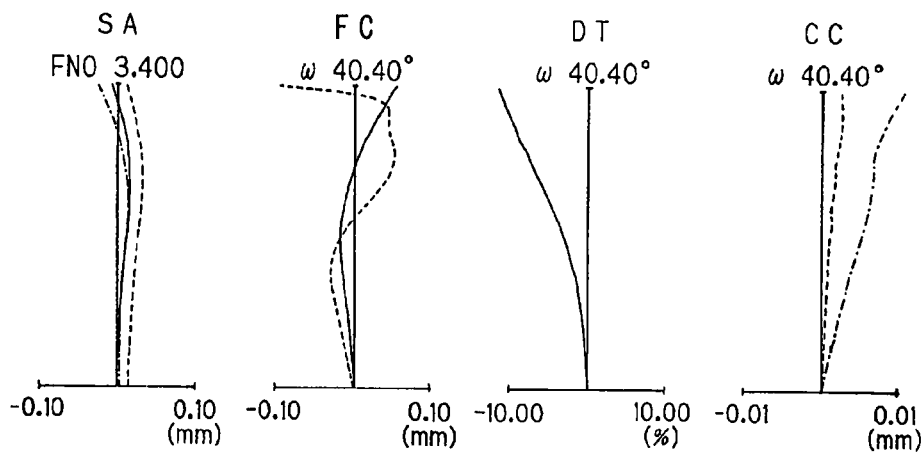
FIGS. 5A to 5C are aberration diagrams of Example 1 of the zoom lens system according to the present invention when focused at infinity, showing a spherical aberration (SA), an astigmatism (FC), a distortion (DT) and a chromatic aberration of magnification (CC)
Figure 5B:
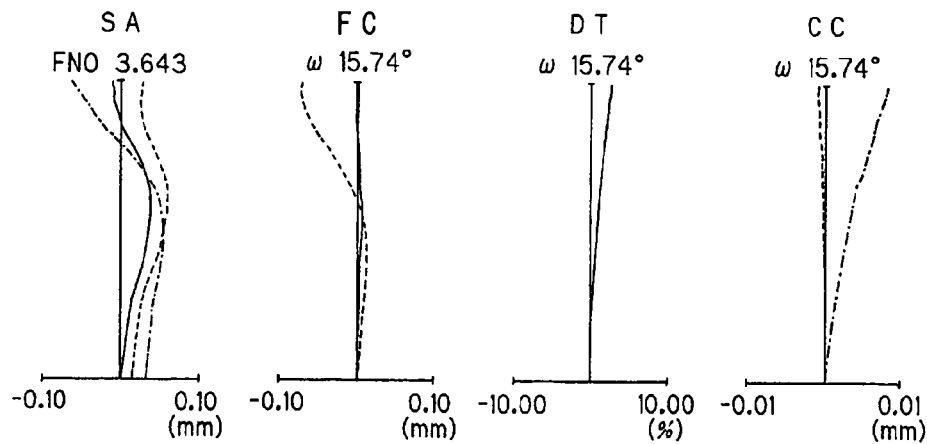
Figure 5C:
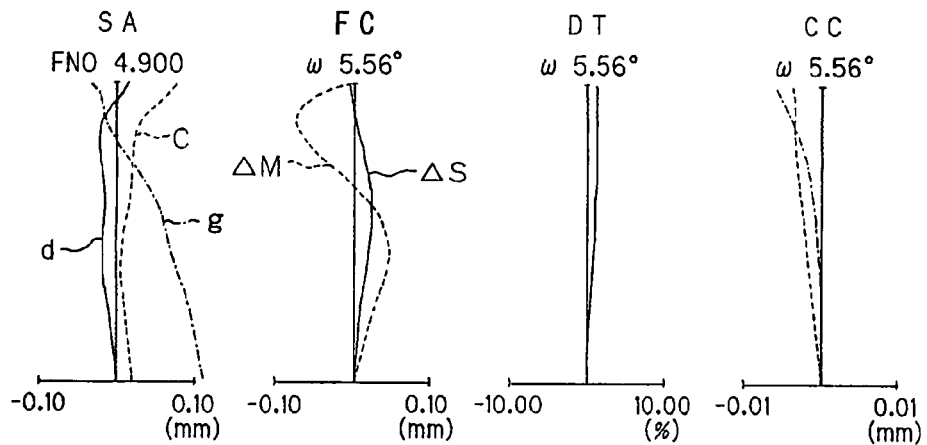
Figure 6A:
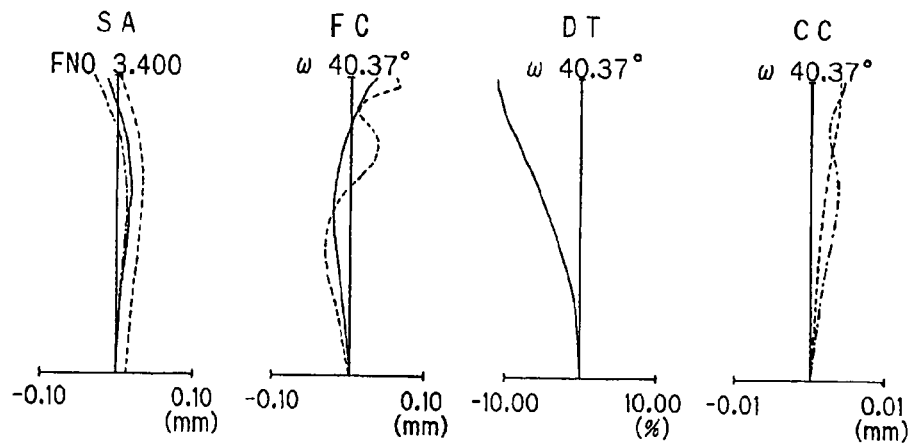
FIGS. 6A to 6C are aberration diagrams of Example 2 of the zoom lens system according to the present invention when focused at infinity, showing a spherical aberration (SA), an astigmatism (FC), a distortion (DT) and a chromatic aberration of magnification (CC)
Figure 6B:
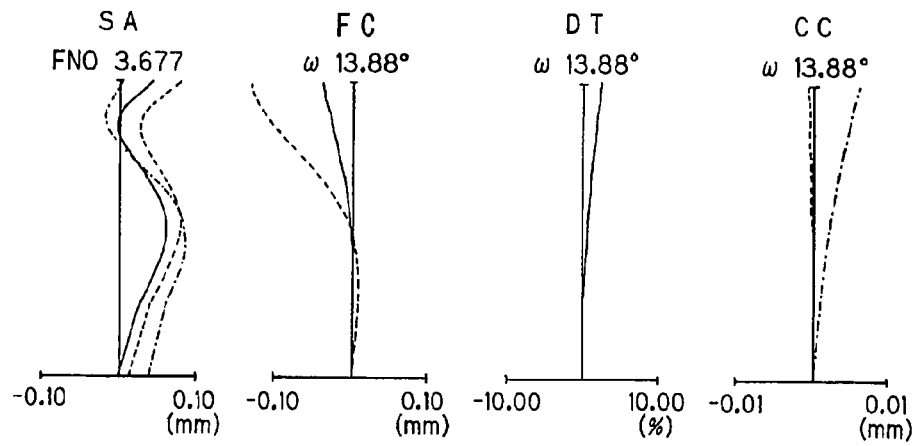
Figure 6C:
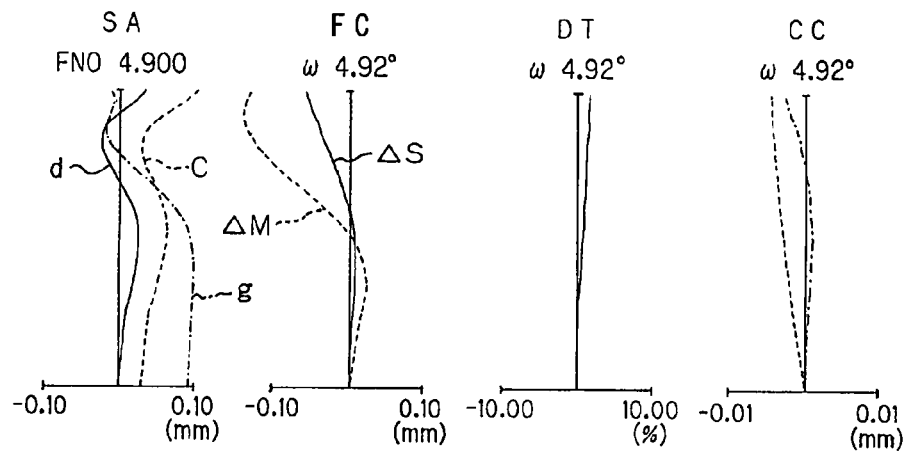
Figure 7A:
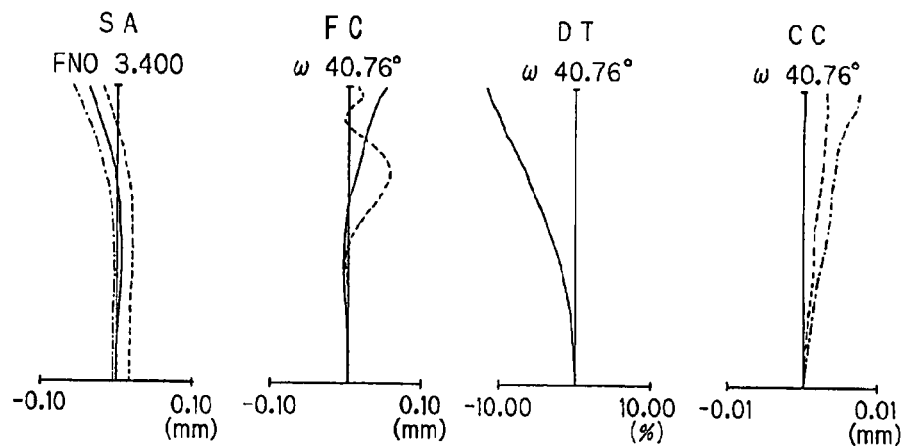
FIGS. 7A to 7C are aberration diagrams of Example 3 of the zoom lens system according to the present invention when focused at infinity, showing a spherical aberration (SA), an astigmatism (FC), a distortion (DT) and a chromatic aberration of magnification (CC)
Figure 7B:
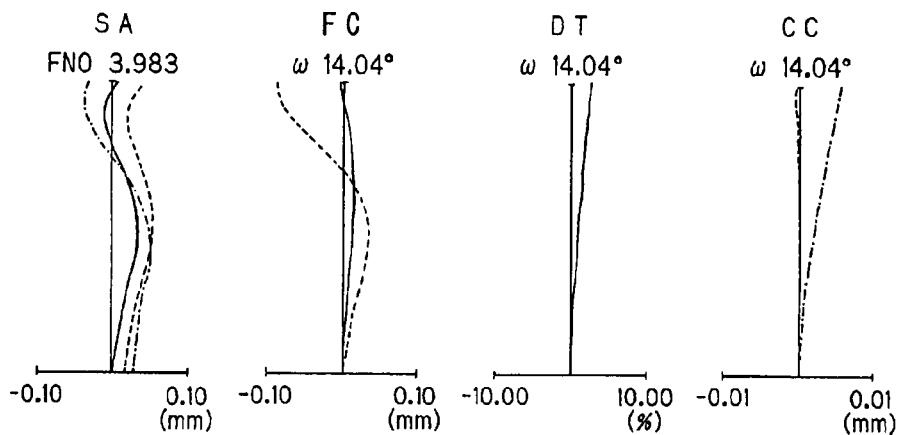
Figure 7C:
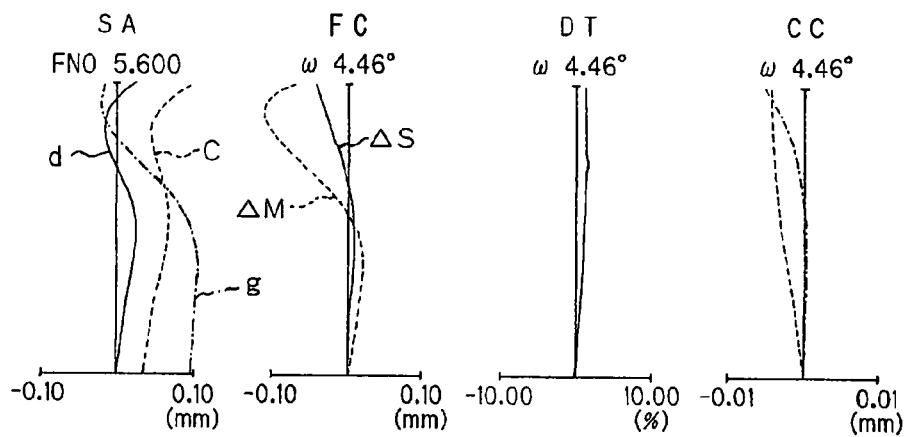
Figure 8A:
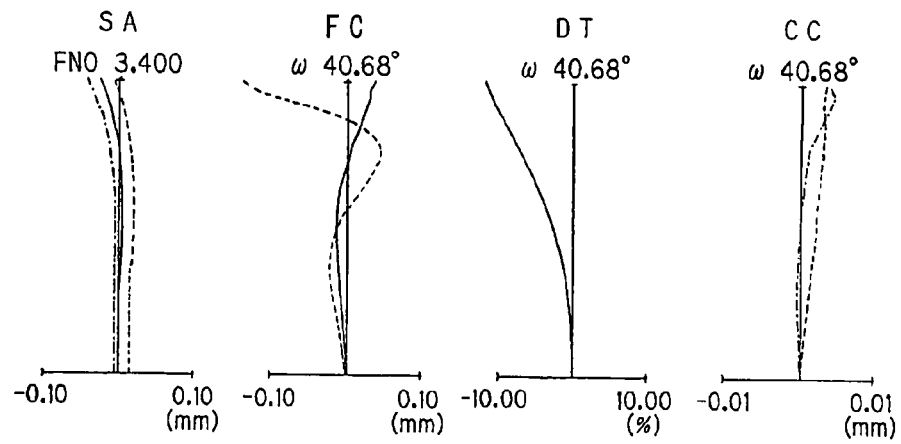
FIGS. 8A to 8C are aberration diagrams of Example 4 of the zoom lens system according to the present invention when focused at infinity, showing a spherical aberration (SA), an astigmatism (FC), a distortion (DT) and a chromatic aberration of magnification (CC)
Figure 8B:
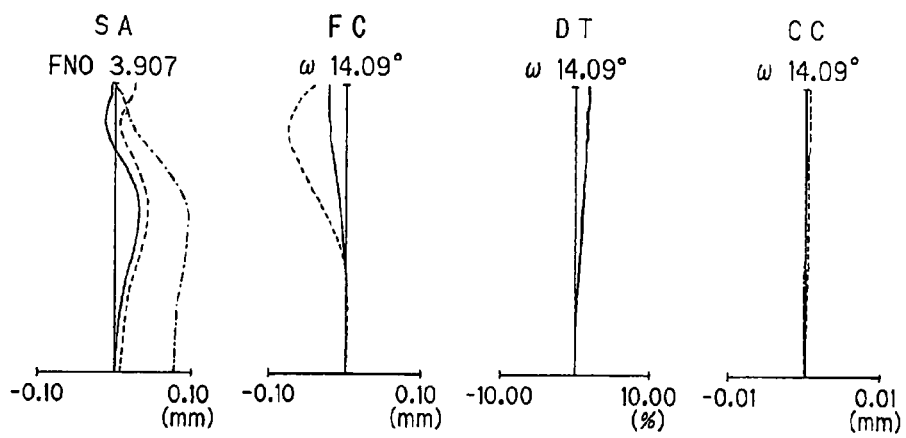
Figure 8C:
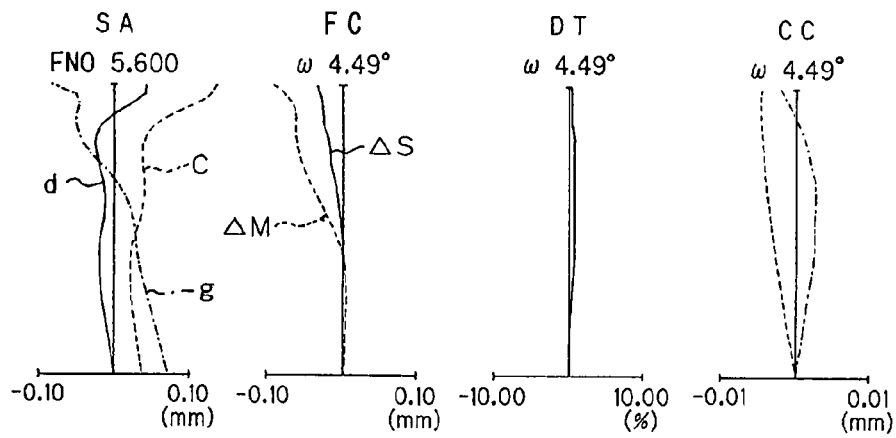

As shown in FIGS. 4A to 4C, Example 4 includes, in order from an object side, a first lens unit G1 having a positive refractive power, a second lens unit G2 having a negative refractive power, an aperture stop S, a third lens unit G3 having a positive refractive power, a fourth lens unit G4 having a positive refractive power and a fifth lens unit G5 having a negative refractive power. During zooming from a wide-angle end to a telephoto end, the first lens unit G1 moves toward the object side, and the second lens unit G2 moves along a track being convex toward an image side while enlarging a space between the second lens unit and the first lens unit G1, and is positioned closer to the object side in the telephoto end than in the wide-angle end. The aperture stop S and the third lens unit G3 integrally move toward the object side while reducing a space between the third lens unit and the second lens unit G2, and the fourth lens unit G4 moves toward the image side while enlarging a space between the fourth lens unit and the third lens unit G3 from the wide-angle end to an intermediate position, and is substantially fixed from the intermediate position to the telephoto end. A position of the fifth lens unit G5 is fixed during the zooming.

The first lens unit G1 includes, in order from the object side, a negative meniscus lens whose convex surface faces the object side and a positive meniscus lens whose convex surface faces the object side. The second lens unit G2 includes, in order from the object side, a negative meniscus lens whose convex surface faces the object side, and a cemented lens constituted by cementing a positive meniscus lens whose convex surface faces the image side and a negative meniscus lens whose convex surface faces the image side. The third lens unit G3 includes, in order from the object side, a double-convex positive lens, and a cemented lens constituted by cementing a positive meniscus lens whose convex surface faces the object side and a negative meniscus lens whose convex surface faces the object side. The fourth lens unit G4 includes one double-convex positive lens, and the fifth lens unit G5 includes one negative meniscus lens whose convex surface faces the image side.

Aspherical surfaces are used on seven surfaces including opposite surfaces of the negative meniscus lens of a single lens of the second lens unit G2, the surface of the cemented lens of the second lens unit closest to the image side, opposite surfaces of the double-convex positive lens of the third lens unit G3 and opposite surfaces of the double-convex positive lens of the fourth lens unit G4.

Next, numerical data of the above examples will be described. In addition to the above symbols, f is a focal length of a zoom lens system, $F_{NO}$ is the F-number, $2\omega$ is an angle of view, WE is a wide-angle end, ST is an intermediate position, TE is a telephoto end, $r_1, r_2, \ldots$ are paraxial radii of curvature of lens surfaces, $d_1, d_2, \ldots$ are spaces between the lens surfaces, $n_{d1}, n_{d2}, \ldots$ are refractive indices of lenses for the d-line, and $v_{d1}, v_{d2}, \ldots$ are the Abbe numbers of the lenses. Symbol (AS) after the radius of curvature indicates that the surface is an aspherical surface, (S) indicates that the surface is an aperture stop surface and (I) indicates that the surface is an image surface, respectively. It is to be noted that a shape of the aspherical surface is represented by the following equation in a coordinate system in which an intersection between the aspherical surface and the optical axis is an origin, an x-axis is aligned with an optical axis, a ray travel direction is a positive direction and a y-axis passes through the origin and crosses the optical axis at right angles:

$$x=(y^2/r)/[1+\{1-(K+1)(y/r)^2\}^{1/2}]+A_4y^4+A_6y^6+A_8y^8+A_{10}y^{10},$$

in which r is a paraxial radius of curvature, K is a conic constant, and $A_4, A_6, A_8$ and $A_{10}$ are 4-th, 6-th, 8-th and 10-th order aspherical coefficients.

EXAMPLE 1

| | | | |
|---|---|---|---|
| $r_1 = 23.276$ | $d_1 = 0.80$ | $n_{d1} = 1.92286$ | $v_{d1} = 18.90$ |
| $r_2 = 16.886$ | $d_2 = 0.27$ | | |
| $r_3 = 18.502$ | $d_3 = 3.15$ | $n_{d2} = 1.77250$ | $v_{d2} = 49.60$ |
| $r_4 = 1934621.497$ | $d_4$ = variable | | |
| $r_5 = -76.912$ (AS) | $d_5 = 0.80$ | $n_{d3} = 1.88300$ | $v_{d3} = 40.76$ |
| $r_6 = 6.215$ (AS) | $d_6 = 2.90$ | | |
| $r_7 = -65.089$ | $d_7 = 1.70$ | $n_{d4} = 1.94595$ | $v_{d4} = 17.98$ |
| $r_8 = -14.821$ | $d_8 = 0.70$ | $n_{d5} = 1.88300$ | $v_{d5} = 40.76$ |
| $r_9 = -31.161$ (AS) | $d_9$ = variable | | |
| $r_{10} = \infty$ (S) | $d_{10} = 0.10$ | | |
| $r_{11} = 6.127$ (AS) | $d_{11} = 2.93$ | $n_{d6} = 1.58913$ | $v_{d6} = 61.14$ |
| $r_{12} = -12.222$ (AS) | $d_{12} = 0.10$ | | |
| $r_{13} = 5.727$ | $d_{13} = 1.63$ | $n_{d7} = 1.60300$ | $v_{d7} = 65.44$ |
| $r_{14} = 14.062$ | $d_{14} = 0.44$ | $n_{d8} = 2.00330$ | $v_{d8} = 28.27$ |
| $r_{15} = 3.685$ | $d_{15}$ = variable | | |
| $r_{16} = 33.340$ (AS) | $d_{16} = 2.32$ | $n_{d9} = 1.74330$ | $v_{d9} = 49.33$ |
| $r_{17} = -12.109$ | $d_{17} = 0.20$ | | |
| $r_{18} = -29.522$ | $d_{18} = 0.60$ | $n_{d10} = 1.92286$ | $v_{d10} = 20.88$ |
| $r_{19} = 452.503$ | $d_{19}$ = variable | | |
| $r_{20} = \infty$ | $d_{20} = 0.40$ | $n_{d11} = 1.54771$ | $v_{d11} = 62.84$ |
| $r_{21} = \infty$ | $d_{21} = 0.50$ | | |
| $r_{22} = \infty$ | $d_{22} = 0.50$ | $n_{d12} = 1.51633$ | $v_{d12} = 64.14$ |
| $r_{23} = \infty$ | $d_{23} = 0.40$ | | |
| $r_{24} = \infty$ (I) | | | |

| Aspherical coefficient |
|---|
| 5th surface |

$K = 0.000$
$A_4 = -6.44747 \times 10^{-4}$    $A_6 = 3.45720 \times 10^{-5}$    $A_8 = -6.96459 \times 10^{-7}$
$A_{10} = 5.19408 \times 10^{-9}$ 6th surface $K = 0.000$
$A_4 = -7.61955 \times 10^{-4}$    $A_6 = 2.09420 \times 10^{-5}$    $A_8 = 5.39682 \times 10^{-7}$
$A_{10} = -1.05748 \times 10^{-9}$ 9th surface $K = 0.000$
$A_4 = -2.69524 \times 10^{-4}$    $A_6 = 5.72012 \times 10^{-6}$    $A_8 = -3.80144 \times 10^{-7}$
$A_{10} = -1.31374 \times 10^{-14}$ 11th surface $K = 0.000$
$A_4 = -9.29614 \times 10^{-4}$    $A_6 = -1.95091 \times 10^{-5}$    $A_8 = 3.68458 \times 10^{-7}$
$A_{10} = -2.02149 \times 10^{-7}$ 12th surface $K = 0.000$
$A_4 = -1.56275 \times 10^{-7}$    $A_6 = -1.48140 \times 10^{-5}$    $A_8 = -9.60633 \times 10^{-7}$
$A_{10} = -9.29691 \times 10^{-8}$ 16th surface $K = 0.000$
$A_4 = -2.25793 \times 10^{-4}$    $A_6 = 1.31531 \times 10^{-5}$    $A_8 = -4.23693 \times 10^{-7}$
$A_{10} = 3.10719 \times 10^{-9}$ -continued

| Zoom Data(∞) | | | |
|---|---|---|---|
| | WE | ST | TE |
| f (mm) | 5.11 | 13.29 | 38.97 |
| $F_{NO}$ | 3.40 | 3.64 | 4.90 |
| 2ω(°) | 80.81 | 31.48 | 11.13 |
| $d_4$ | 0.70 | 8.16 | 16.84 |
| $d_9$ | 15.91 | 7.40 | 0.60 |
| $d_{15}$ | 3.46 | 10.06 | 16.65 |
| $d_{19}$ | 3.17 | 2.38 | 2.47 |

EXAMPLE 2

| | | | |
|---|---|---|---|
| $r_1$ = 23.111 | $d_1$ = 0.80 | $n_{d1}$ = 1.92286 | $v_{d1}$ = 18.90 |
| $r_2$ = 16.980 | $d_2$ = 0.30 | | |
| $r_3$ = 18.653 | $d_3$ = 3.25 | $n_{d2}$ = 1.77250 | $v_{d2}$ = 49.60 |
| $r_4$ = −1327927.221 | $d_4$ = variable | | |
| $r_5$ = −69.365 (AS) | $d_5$ = 0.80 | $n_{d3}$ = 1.88300 | $v_{d3}$ = 40.76 |
| $r_6$ = 6.396 (AS) | $d_6$ = 2.89 | | |
| $r_7$ = −178.996 | $d_7$ = 1.66 | $n_{d4}$ = 1.94595 | $v_{d4}$ = 17.98 |
| $r_8$ = −16.889 | $d_8$ = 0.70 | $n_{d5}$ = 1.88300 | $v_{d5}$ = 40.76 |
| $r_9$ = −46.559 (AS) | $d_9$ = variable | | |
| $r_{10}$ = ∞ (S) | $d_{10}$ = 0.10 | | |
| $r_{11}$ = 6.275 (AS) | $d_{11}$ = 2.58 | $n_{d6}$ = 1.58913 | $v_{d6}$ = 61.14 |
| $r_{12}$ = −15.213 (AS) | $d_{12}$ = 0.10 | | |
| $r_{13}$ = 5.541 | $d_{13}$ = 1.69 | $n_{d7}$ = 1.60300 | $v_{d7}$ = 65.44 |
| $r_{14}$ = 12.437 | $d_{14}$ = 0.44 | $n_{d8}$ = 2.00330 | $v_{d8}$ = 28.27 |
| $r_{15}$ = 3.749 | $d_{15}$ = variable | | |
| $r_{16}$ = 27.569 (AS) | $d_{16}$ = 2.54 | $n_{d9}$ = 1.74330 | $v_{d9}$ = 49.33 |
| $r_{17}$ = −11.835 | $d_{17}$ = 0.20 | | |
| $r_{18}$ = −27.715 | $d_{18}$ = 0.60 | $n_{d10}$ = 1.92286 | $v_{d10}$ = 20.88 |
| $r_{19}$ = 37777.911 | $d_{19}$ = variable | | |
| $r_{20}$ = ∞ | $d_{20}$ = 0.40 | $n_{d11}$ = 1.54771 | $v_{d11}$ = 62.84 |
| $r_{21}$ = ∞ | $d_{21}$ = 0.50 | | |
| $r_{22}$ = ∞ | $d_{22}$ = 0.50 | $n_{d12}$ = 1.51633 | $v_{d12}$ = 64.14 |
| $r_{23}$ = ∞ | $d_{23}$ = 0.40 | | |
| $r_{24}$ = ∞ (I) | | | |

Aspherical coefficient

5th surface

K = 0.000
$A_4 = -6.81929 \times 10^{-4}$  $A_6 = 3.70491 \times 10^{-5}$  $A_8 = -6.86996 \times 10^{-7}$
$A_{10} = 4.56364 \times 10^{-9}$ 6th surface K = 0.000
$A_4 = -7.91477 \times 10^{-4}$  $A_6 = 2.05546 \times 10^{-5}$  $A_8 = 5.63766 \times 10^{-7}$
$A_{10} = 1.45385 \times 10^{-8}$ 9th surface K = 0.000
$A_4 = -2.53924 \times 10^{-4}$  $A_6 = 6.21051 \times 10^{-6}$  $A_8 = -4.27833 \times 10^{-7}$
$A_{10} = -5.16492 \times 10^{-12}$ 11th surface K = 0.000
$A_4 = -7.73664 \times 10^{-4}$  $A_6 = -8.31301 \times 10^{-7}$  $A_8 = -4.22688 \times 10^{-7}$
$A_{10} = -1.20445 \times 10^{-7}$ 12th surface K = 0.000
$A_4 = -9.77378 \times 10^{-9}$  $A_6 = 8.78024 \times 10^{-10}$  $A_8 = -9.31488 \times 10^{-7}$
$A_{10} = -7.08165 \times 10^{-8}$ 16th surface K = 0.000
$A_4 = -2.46628 \times 10^{-4}$  $A_6 = 1.04257 \times 10^{-5}$  $A_8 = -4.43353 \times 10^{-7}$
$A_{10} = 6.07058 \times 10^{-9}$ -continued

| Zoom Data(∞) | | | |
|---|---|---|---|
| | WE | ST | TE |
| f (mm) | 5.09 | 15.16 | 43.95 |
| $F_{NO}$ | 3.40 | 3.68 | 4.90 |
| 2ω(°) | 80.74 | 27.77 | 9.83 |
| $d_4$ | 0.70 | 8.82 | 17.15 |
| $d_9$ | 16.19 | 7.42 | 0.60 |
| $d_{15}$ | 3.53 | 12.57 | 19.50 |
| $d_{19}$ | 3.39 | 1.99 | 2.39 |

EXAMPLE 3

| | | | |
|---|---|---|---|
| $r_1$ = 23.459 | $d_1$ = 0.80 | $n_{d1}$ = 1.92286 | $v_{d1}$ = 18.90 |
| $r_2$ = 17.143 | $d_2$ = 0.31 | | |
| $r_3$ = 18.782 | $d_3$ = 3.26 | $n_{d2}$ = 1.77250 | $v_{d2}$ = 49.60 |
| $r_4$ = 81961.446 | $d_4$ = variable | | |
| $r_5$ = −91.408 (AS) | $d_5$ = 0.80 | $n_{d3}$ = 1.88300 | $v_{d3}$ = 40.76 |
| $r_6$ = 6.271 (AS) | $d_6$ = 2.83 | | |
| $r_7$ = −193.523 | $d_7$ = 1.71 | $n_{d4}$ = 1.94595 | $v_{d4}$ = 17.98 |
| $r_8$ = −16.149 | $d_8$ = 0.70 | $n_{d5}$ = 1.88300 | $v_{d5}$ = 40.76 |
| $r_9$ = −55.369 (AS) | $d_9$ = variable | | |
| $r_{10}$ = ∞ (S) | $d_{10}$ = 0.10 | | |
| $r_{11}$ = 6.374 (AS) | $d_{11}$ = 2.61 | $n_{d6}$ = 1.58913 | $v_{d6}$ = 61.14 |
| $r_{12}$ = −14.919 (AS) | $d_{12}$ = 0.10 | | |
| $r_{13}$ = 5.474 | $d_{13}$ = 1.68 | $n_{d7}$ = 1.60300 | $v_{d7}$ = 65.44 |
| $r_{14}$ = 11.918 | $d_{14}$ = 0.44 | $n_{d8}$ = 2.00330 | $v_{d8}$ = 28.27 |
| $r_{15}$ = 3.747 | $d_{15}$ = variable | | |
| $r_{16}$ = 30.794 (AS) | $d_{16}$ = 2.84 | $n_{d9}$ = 1.74330 | $v_{d9}$ = 49.33 |
| $r_{17}$ = −11.449 (AS) | $d_{17}$ = 0.20 | | |
| $r_{18}$ = −27.742 | $d_{18}$ = 0.60 | $n_{d10}$ = 1.92286 | $v_{d10}$ = 20.88 |
| $r_{19}$ = 8237.612 | $d_{19}$ = variable | | |
| $r_{20}$ = ∞ | $d_{20}$ = 0.40 | $n_{d11}$ = 1.54771 | $v_{d11}$ = 62.84 |
| $r_{21}$ = ∞ | $d_{21}$ = 0.50 | | |
| $r_{22}$ = ∞ | $d_{22}$ = 0.50 | $n_{d12}$ = 1.51633 | $v_{d12}$ = 64.14 |
| $r_{23}$ = ∞ | $d_{23}$ = 0.40 | | |
| $r_{24}$ = ∞ (I) | | | |

Aspherical coefficient

5th surface

K = 0.000
$A_4 = -4.98816 \times 10^{-4}$  $A_6 = 2.73662 \times 10^{-5}$  $A_8 = -5.45976 \times 10^{-7}$
$A_{10} = 3.90498 \times 10^{-9}$ 6th surface K = 0.000
$A_4 = -5.07784 \times 10^{-4}$  $A_6 = 8.45751 \times 10^{-6}$  $A_8 = 1.16463 \times 10^{-6}$
$A_{10} = -1.63586 \times 10^{-8}$ 9th surface K = 0.000
$A_4 = -2.72856 \times 10^{-4}$  $A_6 = 3.98544 \times 10^{-6}$  $A_8 = -3.66810 \times 10^{-7}$
$A_{10} = 8.12365 \times 10^{-10}$ 11th surface K = 0.000
$A_4 = -7.43055 \times 10^{-4}$  $A_6 = -1.75166 \times 10^{-6}$  $A_8 = -1.21068 \times 10^{-6}$
$A_{10} = -7.05472 \times 10^{-8}$ 12th surface K = 0.000
$A_4 = 2.22101 \times 10^{-7}$  $A_6 = -1.62815 \times 10^{-6}$  $A_8 = -1.62165 \times 10^{-6}$
$A_{10} = -1.95788 \times 10^{-8}$ 16th surface K = 0.000
$A_4 = -4.66685 \times 10^{-5}$  $A_6 = 1.24136 \times 10^{-7}$  $A_8 = -3.81918 \times 10^{-7}$
$A_{10} = 1.03287 \times 10^{-9}$ -continued 17th surface K = 0.000
$A_4 = 3.05458 \times 10^{-4}$   $A_6 = -1.38177 \times 10^{-5}$   $A_8 = -5.49386 \times 10^{-8}$
$A_{10} = 1.82911 \times 10^{-9}$ Zoom Data(∞)

|  | WE | ST | TE |
|---|---|---|---|
| f (mm) | 5.06 | 14.97 | 48.66 |
| $F_{NO}$ | 3.40 | 3.98 | 5.60 |
| 2ω(°) | 81.52 | 28.09 | 8.93 |
| $d_4$ | 0.70 | 8.90 | 17.86 |
| $d_9$ | 15.95 | 7.47 | 0.60 |
| $d_{15}$ | 3.42 | 12.46 | 21.46 |
| $d_{19}$ | 3.46 | 2.26 | 2.34 |

EXAMPLE 4

| $r_1 = 23.493$ | $d_1 = 0.80$ | $n_{d1} = 1.92286$ | $v_{d1} = 18.90$ |
|---|---|---|---|
| $r_2 = 17.925$ | $d_2 = 0.34$ | | |
| $r_3 = 20.098$ | $d_3 = 3.09$ | $n_{d2} = 1.77250$ | $v_{d2} = 49.60$ |
| $r_4 = 1047.951$ | $d_4 = $ variable | | |
| $r_5 = 3318.714$ (AS) | $d_5 = 0.80$ | $n_{d3} = 1.88300$ | $v_{d3} = 40.76$ |
| $r_6 = 5.960$ (AS) | $d_6 = 3.03$ | | |
| $r_7 = -91.391$ | $d_7 = 1.94$ | $n_{d4} = 1.94595$ | $v_{d4} = 17.98$ |
| $r_8 = -15.300$ | $d_8 = 0.70$ | $n_{d5} = 1.88300$ | $v_{d5} = 40.76$ |
| $r_9 = -44.573$ (AS) | $d_9 = $ variable | | |
| $r_{10} = \infty$ (S) | $d_{10} = 0.10$ | | |
| $r_{11} = 6.687$ (AS) | $d_{11} = 2.64$ | $n_{d6} = 1.58913$ | $v_{d6} = 61.14$ |
| $r_{12} = -13.045$ (AS) | $d_{12} = 0.10$ | | |
| $r_{13} = 5.392$ | $d_{13} = 1.95$ | $n_{d7} = 1.60300$ | $v_{d7} = 65.44$ |
| $r_{14} = 19.003$ | $d_{14} = 0.44$ | $n_{d8} = 2.00330$ | $v_{d8} = 28.27$ |
| $r_{15} = 3.704$ | $d_{15} = $ variable | | |
| $r_{16} = 43.917$ (AS) | $d_{16} = 2.37$ | $n_{d9} = 1.74330$ | $v_{d9} = 49.33$ |
| $r_{17} = -16.386$ (AS) | $d_{17} = $ variable | | |
| $r_{18} = -9.213$ | $d_{18} = 0.98$ | $n_{d10} = 1.84666$ | $v_{d10} = 23.78$ |
| $r_{19} = -9.266$ | $d_{19} = 0.69$ | | |
| $r_{20} = \infty$ | $d_{20} = 0.40$ | $n_{d11} = 1.54771$ | $v_{d11} = 62.84$ |
| $r_{21} = \infty$ | $d_{21} = 0.50$ | | |
| $r_{22} = \infty$ | $d_{22} = 0.50$ | $n_{d12} = 1.51633$ | $v_{d12} = 64.14$ |
| $r_{23} = \infty$ | $d_{23} = 0.40$ | | |
| $r_{24} = \infty$ (image surface) | | | |

Aspherical coefficient

5th surface

K = 0.000
$A_4 = -2.85182 \times 10^{-4}$   $A_6 = 9.57407 \times 10^{-6}$   $A_8 = -1.36789 \times 10^{-7}$
$A_{10} = 7.34817 \times 10^{-10}$ 6th surface K = 0.000
$A_4 = -2.91913 \times 10^{-4}$   $A_6 = 3.07861 \times 10^{-6}$   $A_8 = 1.03870 \times 10^{-7}$
$A_{10} = 1.07178 \times 10^{-8}$ 9th surface K = 0.000
$A_4 = -2.76702 \times 10^{-4}$   $A_6 = 3.13845 \times 10^{-6}$   $A_8 = -2.86578 \times 10^{-7}$
$A_{10} = -1.69342 \times 10^{-11}$ 11th surface K = 0.000
$A_4 = -6.83725 \times 10^{-4}$   $A_6 = -2.81656 \times 10^{-5}$   $A_8 = 9.31002 \times 10^{-7}$
$A_{10} = -1.90767 \times 10^{-7}$ 12th surface K = 0.000
$A_4 = 3.17353 \times 10^{-5}$   $A_6 = -2.97777 \times 10^{-5}$   $A_8 = 3.13349 \times 10^{-7}$
$A_{10} = -1.12469 \times 10^{-7}$ -continued 16th surface K = 0.000
$A_4 = 1.04065 \times 10^{-4}$   $A_6 = -1.28593 \times 10^{-5}$   $A_8 = 5.59241 \times 10^{-8}$
$A_{10} = 2.19119 \times 10^{-11}$ 17th surface K = 0.000
$A_4 = 3.28952 \times 10^{-4}$   $A_6 = -3.14487 \times 10^{-5}$   $A_8 = 8.22975 \times 10^{-7}$
$A_{10} = -1.11553 \times 10^{-8}$ Zoom Data(∞)

|  | WE | ST | TE |
|---|---|---|---|
| f (mm) | 5.08 | 15.02 | 48.74 |
| $F_{NO}$ | 3.40 | 3.91 | 5.60 |
| 2ω(°) | 81.37 | 28.19 | 8.98 |
| $d_4$ | 0.70 | 8.42 | 18.16 |
| $d_9$ | 16.52 | 7.12 | 0.60 |
| $d_{15}$ | 3.66 | 12.20 | 21.50 |
| $d_{17}$ | 2.50 | 1.78 | 1.78 |

FIGS. 5A to 8C are aberration diagrams of Examples 1 to 4 when focused at infinity, each showing a spherical aberration SA, an astigmatism FC, a distortion DT and a chromatic aberration DT of magnification. In these aberration diagrams, FIGS. 5A, 6A, 7A and 8A show the aberrations in a wide-angle end, FIGS. 5B, 6B, 7B and 8B show the aberrations in an intermediate position, and FIGS. 5C, 6C, 7C and 8C show the aberrations in a telephoto end. In the drawings, ω is a half angle of view.

Next, values of the conditions (1) to (7) of Examples 1 to 4 will be described.

TABLE 1

| | Conditions | | | | | | |
|---|---|---|---|---|---|---|---|
| | (1) | (2) | (3) | (4) | (5) | (6) | (7) |
| Example 1 | 36.97 | 7.64 | 0.95 | 0.76 | 0.95 | 1.46 | −1.000 |
| Example 2 | 37.03 | 8.63 | 0.83 | 0.73 | 0.98 | 1.37 | −1.000 |
| Example 3 | 37.11 | 9.57 | 0.76 | 0.71 | 0.95 | 1.30 | −1.000 |
| Example 4 | 37.10 | 9.60 | 0.79 | 0.74 | 0.81 | 1.31 | −1.000 |

Next, a basic concept in a case where a distortion generated in the zoom lens system is electrically corrected.

Figure 9:
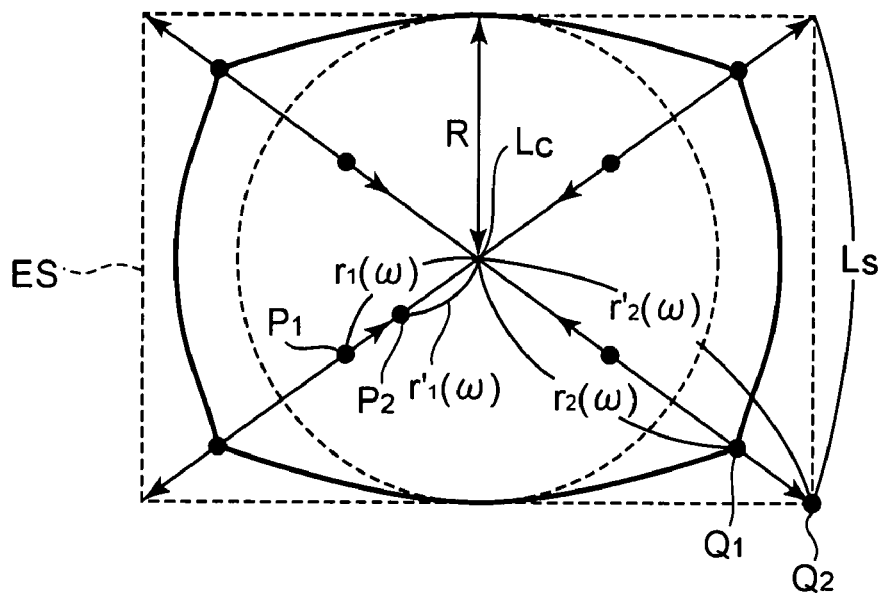
FIG. 9 is a diagram showing a basic concept in a case where a distortion of an image is electrically corrected.
Figure 10:
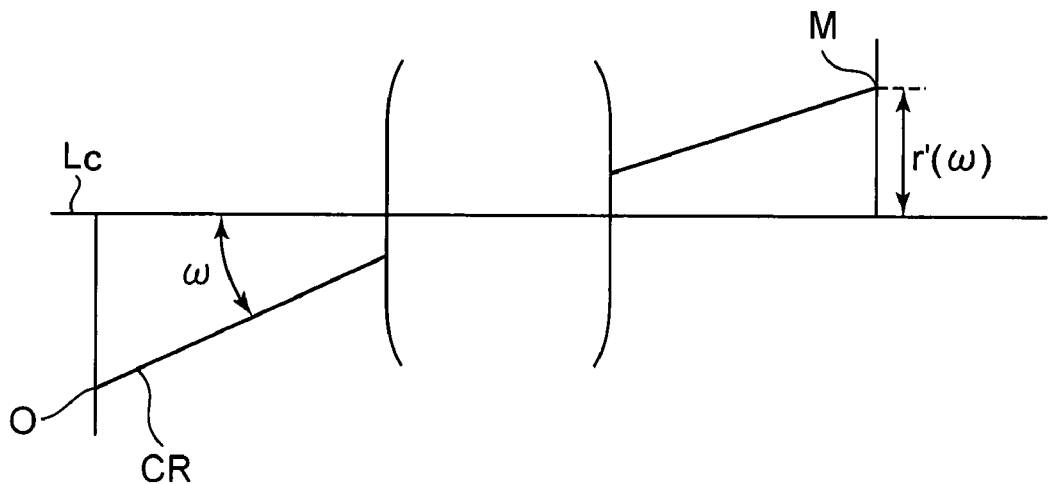
FIG. 10 is a diagram showing meaning of a half angle of an object view.

As shown in FIG. 9, a circle which comes in contact with long sides of an effective image pickup surface ES having the center on an intersection between an optical axis Lc and the image pickup surface and which has a radius R (an image height R) is considered. Magnifications at points on the circumference of this circle are fixed, and circumferential points are regarded as references for the correction. Moreover, other circumferential points on an arbitrary radius r(ω) (the image height r(ω) are moved in a substantially radial direction, and are concentrically moved so as to provide a radius r'(ω). In consequence, a distortion of the optical image is corrected. For example, in FIG. 9, a point $P_1$ positioned inwardly from the circle having the radius R on a circumference of an arbitrary radius $r_1(\omega)$ is moved to a point $P_2$ on a circumference of the radius $r_1'(\omega)$ inwardly toward the center of the circle. A point $Q_1$ positioned on a circumference of an arbitrary radius $r_2(\omega)$ outside the circle having the radius R is moved to a point $Q_2$ on a circumference of a radius $r_2'(\omega)$ away from the center of the circle. Here, the radius r'(ω) can be represented as follows:

$$r'(\omega) = \alpha \cdot f \tan \omega (0 \leq \alpha \leq 1),$$

in which ω is a half angle of an object view, and f is a focal length of an image forming optical system (a zoom lens in the present invention). Here, as shown in FIG. 10, the half angle of the object view is an angle between the optical axis Lc and a chief ray CR from an object point O corresponding to an image point M formed at a position of a height r'(ω) from the center of the image pickup surface.

Here, assuming that an ideal image height corresponding to a point on the circumference of the radius R (the image height R) is Y, the following equation results:

$$\alpha = R/Y = R/(f \cdot \tan \omega).$$

Ideally, the optical system is rotationally symmetric with respect to the optical axis. Therefore, the distortion is also rotationally symmetrically generated with respect to the optical axis. In a case where the optically generated distortion is electrically corrected, if the distortion can be corrected using symmetry with respect to the optical axis as described above, the correction is advantageous in respect of a data amount and a calculation amount.

However, when the optical image is photographed with an electronic image pickup device, the image is not represented by a continuous amount due to sampling by pixels of the image pickup device. Therefore, the circle of the radius R virtually drawn on the optical image is not a strictly correct circle, if the pixels are not radially arranged on the image pickup surface of the electronic image pickup device. That is, to correct a shape of an image given as an aggregate of data obtained from discrete coordinate points (the pixels of the electronic image pickup device), the circle having the magnification fixed as described above does not actually exist. Therefore, it is preferable to use a method of determining a moved coordinate $(X_i', Y_j')$ for each pixel (coordinate $(X_i, Y_j)$). It is to be noted that when a plurality of pixels move to a position of one coordinate $(X_i', Y_j')$, an average value of values of the pixels is obtained as data of the pixels at positions of the coordinate $(X_i', Y_j')$. Moreover, data of a position where any point does not come is prepared by interpolation using data of several surrounding pixels having data generated by the movements of the pixels.

Especially, in an electronic image pickup apparatus using a zoom lens system, such a method is effective for the correction in a case where the point of the optical image in which the magnification should be fixed does not exist on the circumference having the center on the optical axis, and the circle of the radius R drawn on the optical image is asymmetric due to manufacturing errors and the like of the optical system and the electronic image pickup device.

In the electronic image pickup apparatus in which such correction is performed, to calculate a correction amount r'(ω)−r(ω), data indicating a relation between the half angle ω of the object view and the image height r, or data indicating a relation between the actual image height r and an ideal image height r' and α may be recorded in a recording medium incorporated in the electronic image pickup apparatus.

It is to be noted that the radius R may satisfy the following condition so that a light quantity does not excessively fall short at opposite ends of the image in a short-side direction, after the distortion of the image has been corrected.

$$0 \leq R \leq 0.6 L_s,$$

in which $L_s$ is a length of the short side of the effective image pickup surface.

The radius R preferably satisfies the following condition.

$$0.3 L_s \leq R \leq 0.6 L_s.$$

Furthermore, it is most advantageous that the radius R is substantially equal to the radius of the circle which comes in contact with the long sides of the effective image pickup surface.

It is to be noted that in a case where the magnification is fixed in the vicinity of the radius R=0, that is, in the vicinity of the optical axis to perform the correction, a region extended in a radial direction increases. Therefore, the constitution is slightly disadvantageous in respect of the number of the pixels, but it is possible to secure an effect that the zoom lens system can be miniaturized even when the field of view is enlarged.

It is to be noted that the correction of the distortion of one image has been described above, but the focal length of the zoom lens system changes, and a state of the distortion included in the image changes with the change of the focal length. Therefore, it is preferable that a focal length zone which requires the correction between a maximum value (the telephoto end) and a minimum value (the wide-angle end) of the focal length is divided into several focal length zones to correct the distortion. For example, a correction amount is set so as to obtain a correction result which substantially satisfies $r'(\omega) = \alpha \cdot f \cdot \tan \omega$ in each divided focal length zone in the vicinity of the telephoto end (a state in which the focal length is maximized in each zone), and the distortion of the image can be corrected in the corresponding zone by use of this correction amount. However, in this case, a certain degree of barrel type distortion remains in the resultant image in each divided focal length zone in the wide-angle end (a state in which the focal length is minimized in each zone). To avoid this, if the number of the focal length zones is increased, an amount of the data to be recorded for the correction in the recording medium increases. To solve the problem, one or several coefficients with respect to one or several focal lengths different from those in the telephoto end and the wide-angle end of the divided focal length zones are calculated beforehand. This coefficient may be determined based on a simulation or a measurement result of a case where the image pickup apparatus is actually used. Moreover, the correction amount is calculated so as to obtain the correction result which substantially satisfies the following condition in the vicinity of the telephoto end of each divided focal length zone:

$$r'(\omega) = \alpha \cdot f \cdot \tan \omega.$$

This correction amount may be multiplied by the coefficient for each focal length to determine the correction amount in the state of the focal length.

In addition, in a case where any distortion is not seen in an image obtained when focused at infinity, the following is established:

$$f = y/\tan \omega,$$

in which y is a height (an image height) of the image point from the optical axis, f is a focal length of the image forming system (the zoom lens system in the present invention), and ω is a half angle of an object view.

In a case where the image forming system has the barrel type distortion, the following results:

$$f > y/\tan \omega.$$

That is, assuming that the focal length f and the image height y of the image forming system are constant, α value of ω increases.

Next, an embodiment of an electronic image pickup apparatus to which the zoom lens system of the present invention is applied will be described.

Figure 11:
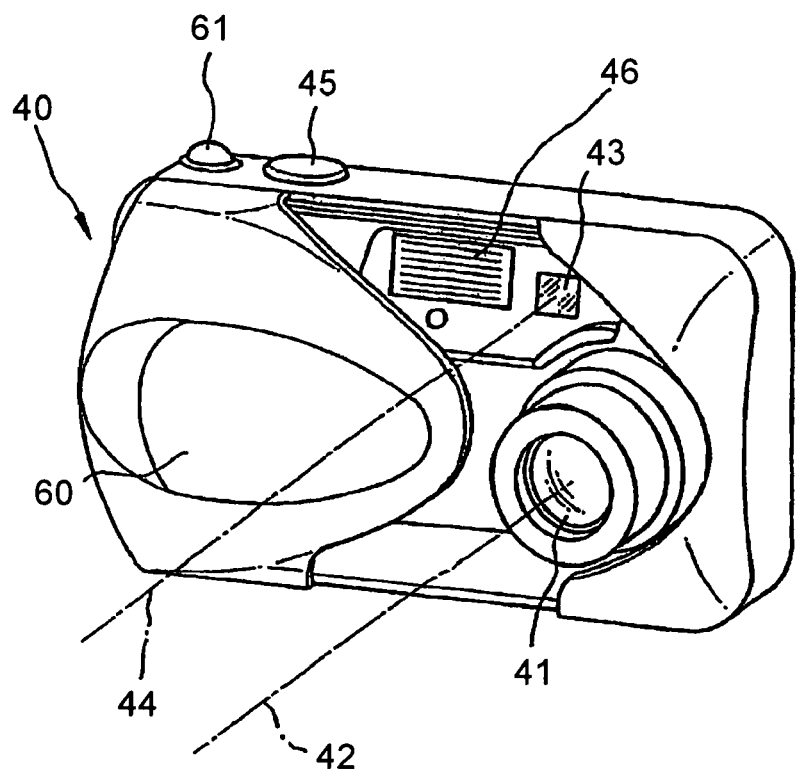
FIG. 11 is a front perspective view showing an appearance of a digital camera as an example of an image pickup apparatus according to the present invention.
Figure 12:
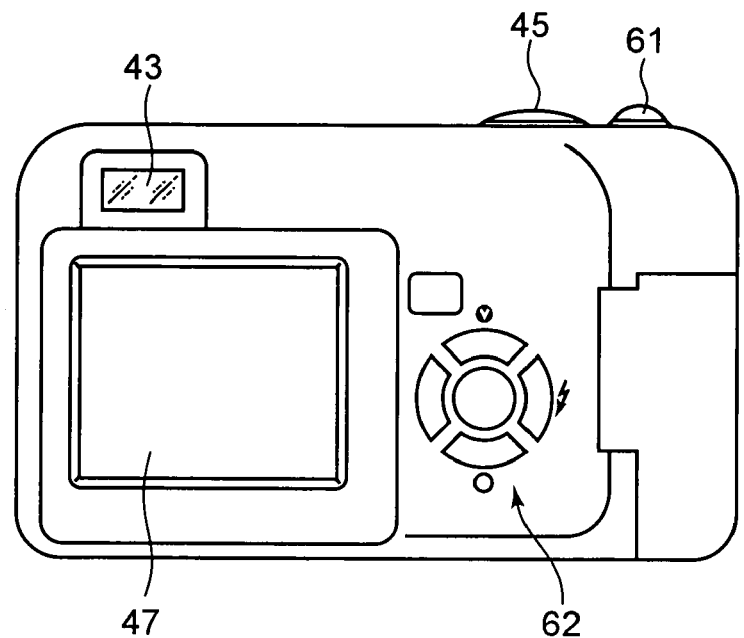
FIG. 12 is a back view of the digital camera of FIG. 11.
Figure 13:
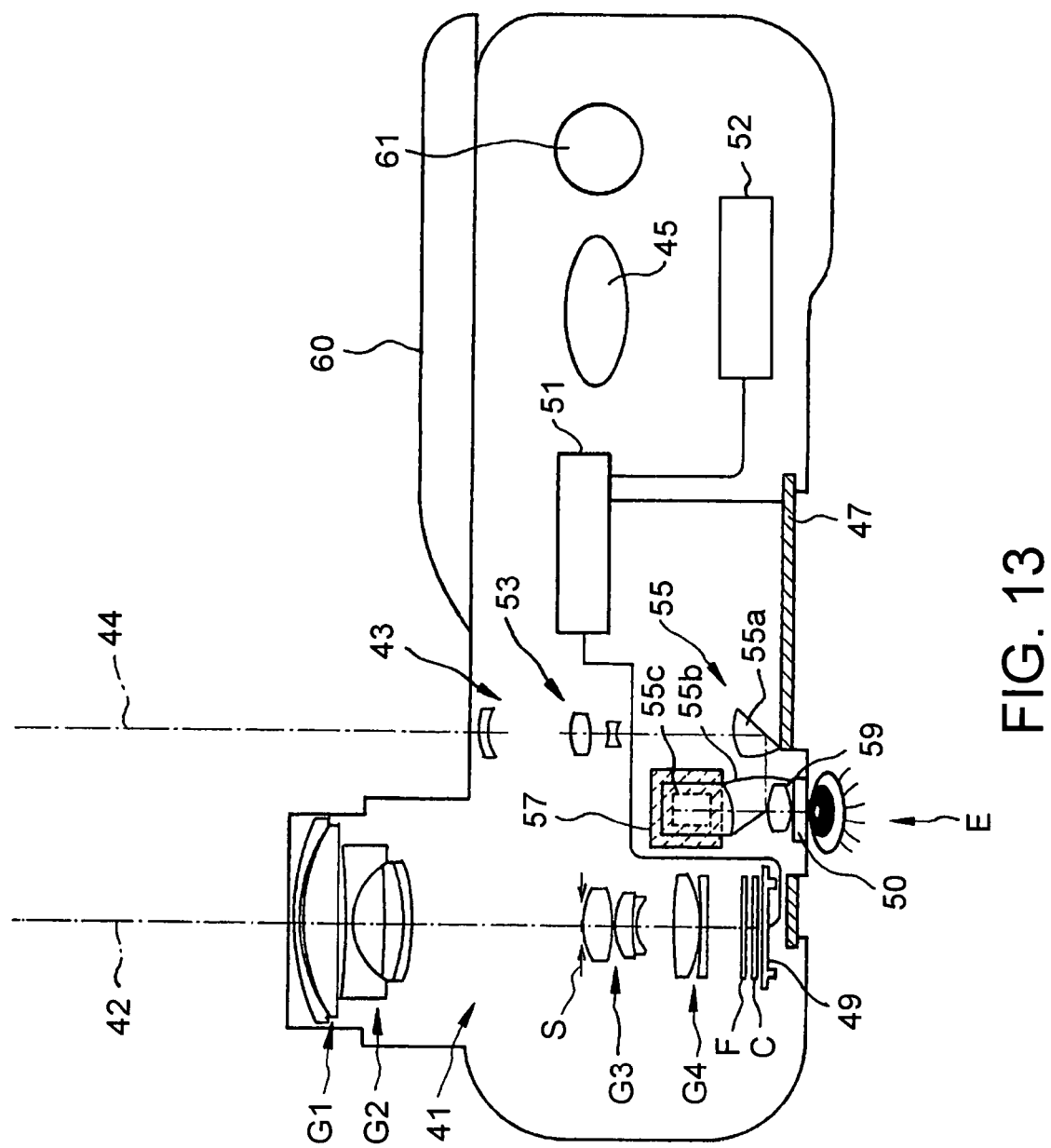
FIG. 13 is a schematic diagram showing an inner constitution of the digital camera of FIG. 11.

FIGS. 11 to 13 are conceptual diagrams showing a constitution of a digital camera in which the zoom lens system of the present invention is incorporated as a photographing optical system. FIG. 11 is a front perspective view showing an appearance of a digital camera, FIG. 12 is a back view of the digital camera, and FIG. 13 is a schematic sectional view showing an internal constitution of the digital camera. FIGS. 11 and 13 show a non-collapsed state of the photographing optical system. A digital camera 40 includes a photographing optical system 41 positioned along an optical path 42 for photographing, a finder optical system 43 positioned along an optical path 44 for a finder, a shutter release button 45, a flash lamp 46, a liquid crystal display monitor 47, a focal length change button 61, a setting change switch 62 and the like. In a case where the photographing optical system 41 is collapsed, when a cover 60 is slid, the photographing optical system 41, the finder optical system 43 and the flash lamp 46 are covered with the cover 60. Moreover, when the cover 60 is opened to bring the camera 40 into a photographing state, the photographing optical system 41 is brought into the non-collapsed state shown in FIG. 13. When the shutter release button 45 disposed at an upper portion of the camera 40 is pressed, the photographing is performed through the photographing optical system 41 in response to the pressed button. In this example, the zoom lens system shown in FIG. 1A is used, but the zoom lens system according to any example may be used. An image of an object to be photographed by the photographing optical system 41 is formed on an image pickup surface (a photoelectric conversion surface) of a CCD image sensor 49 via a low pass filter F and a cover glass C provided with a wavelength band restrictive coating. The object image received by the CCD image sensor 49 is displayed as an electronic image in the liquid crystal display monitor 47 provided at a back surface of the camera via processing means 51. The processing means 51 is connected to recording means 52, and the photographed electronic image can be recorded. It is to be noted that this recording means 52 may be integrated with the processing means 51, or the means may separately be arranged. As the recording means, a memory or a hard disk drive (HDD) incorporated in the digital camera may be used, or an HDD detachably attached to the digital camera, a memory card, a DVD or the like may be used.

Furthermore, an objective optical system 53 for the finder is disposed along the optical path 44 for the finder. The objective optical system 53 for the finder is a zoom optical system constituted of a plurality of lens units (three lens units in the drawing) and an image erecting prism system 55 including prisms 55a, 55b and 55c. The objective optical system for the finder is constituted so that a focal length changes in conjunction with a zoom lens of the photographing optical system 41. The object image formed by the objective optical system 53 for the finder is formed on a view field frame 57 of the image erecting prism system 55. On an emission side of this image erecting prism system 55, an eyepiece optical system 59 is disposed which guides an erected image into an observer's eyeball E. A cover member 50 is disposed on an emission side of the eyepiece optical system 59.

Figure 14:
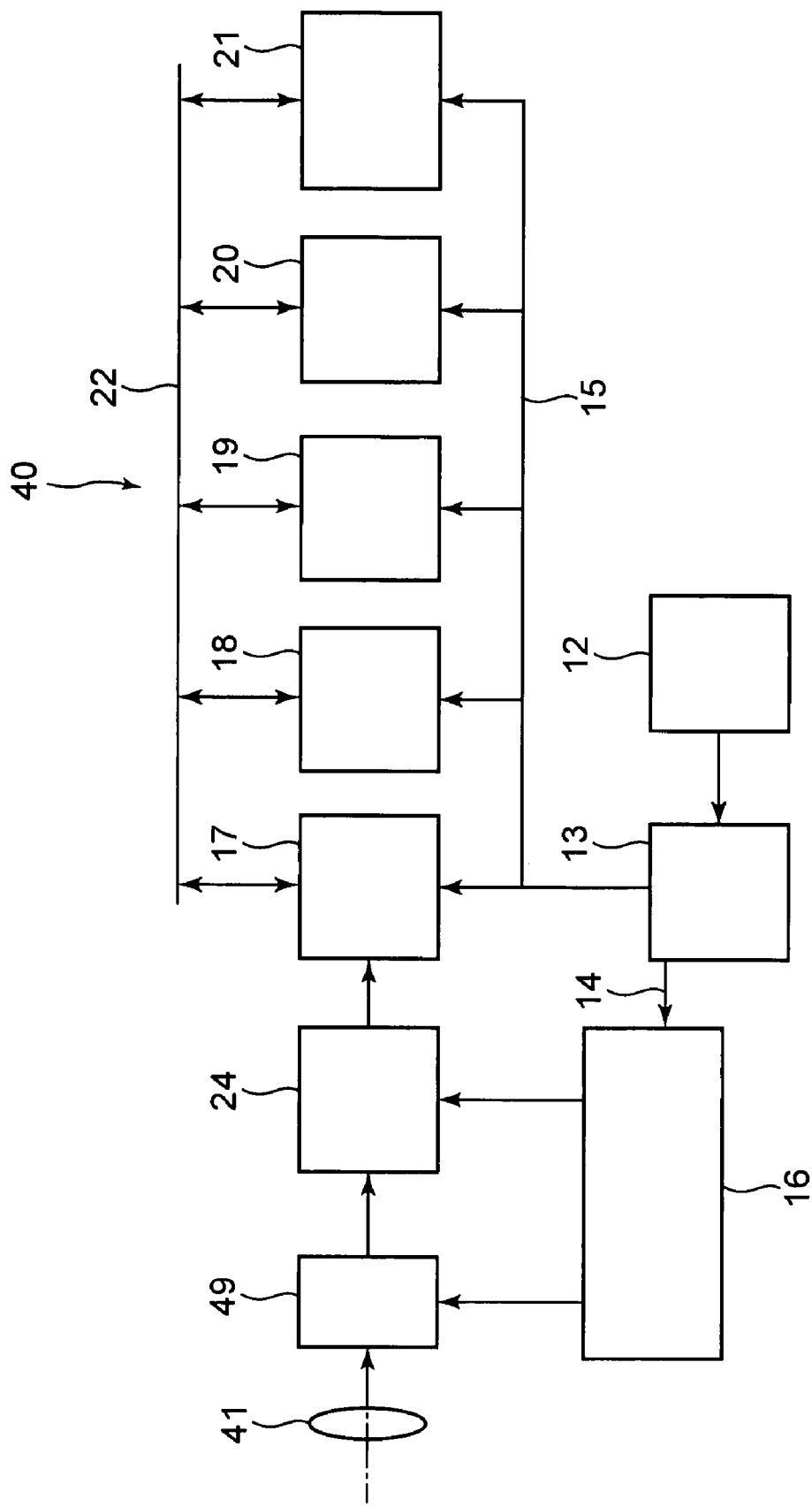
FIG. 14 is a block diagram showing a main part of an inner circuit of the digital camera shown in FIG. 11.

FIG. 14 is a block diagram of a main part of an internal circuit of the digital camera 40. It is to be noted that in the following description, the processing means 51 includes, for example, a CDS/ADC section 24, a temporary storage memory 17, an image processing section 18 and the like, and the recording means 52 includes a storage medium section 19 and the like.

As shown in FIG. 14, the digital camera 40 includes an operating section 12, a control section 13 connected to this operating section 12, and an image pickup driving circuit 16, the temporary storage memory 17, the image processing section 18, the storage medium section 19, a display section 20 and a setting information storage memory section 21 which are connected to a control signal output port of the control section 13 via buses 14 and 15.

The temporary storage memory 17, the image processing section 18, the storage medium section 19, the display section 20 and the setting information storage memory section 21 are constituted so that they can input or output data with respect to one another via a bus 22. The image pickup driving circuit 16 is connected to a CCD image sensor 49 and the CDS/ADC section 24.

The operating section 12 includes various input buttons and switches such as the shutter release button, the camera setting change switch and a focal length change button, and transmits, to the control section, event information input from the outside (a camera user) via these input buttons and switches. The control section 13 includes, for example, a central processing unit (CPU) in which a program memory (not shown) is incorporated and which controls the whole digital camera 40 in response to an instruction command input from the camera user via the operating section 12 in accordance with a program stored in the program memory.

The CCD image sensor 49 receives the object image formed via the photographing optical system 41. The CCD image sensor 49 is an image pickup device which is driven and controlled by the image pickup driving circuit 16 and which converts, into an electric signal, a light quantity of the object image for each pixel to output the signal to the CDS/ADC section 24.

The CDS/ADC section 24 is a circuit which amplifies the electric signal output from the CCD image sensor 49 and which subjects the signal to analog/digital conversion to output, to the temporary storage memory 17, video bare data (hereinafter referred to as the raw data) simply subjected to the amplification and digital conversion.

The temporary storage memory 17 is a buffer including, for example, an SDRAM and the like, and is a memory device in which the raw data output from the CDS/ADC section 24 is temporarily stored. The image processing section 18 is a circuit which reads the raw data stored in the temporary storage memory 17 or the storage medium section 19 to subject the data to various electric image processing including distortion correction based on an image quality parameter designated by the control section 13.

The storage medium section 19 is a control circuit of, for example, an apparatus to which a card or stick type recording medium including a flash memory and the like is detachably attached and in which the raw data transferred from the temporary storage memory 17 and image data subjected to image processing by the image processing section 18 are recorded and retained in the card or stick type flash memory.

The display section 20 includes the liquid crystal display monitor 47 and a circuit to display an image, an operation menu and the like in the liquid crystal display monitor 47.

The setting information storage memory section 21 includes an ROM section in which various image quality parameters are stored beforehand, an RAM section to store the image quality parameter selected from the image quality parameters read from the ROM section by an input operation of the operating section 12, and a circuit which controls input/output with respect to these memories.

The digital camera 40 constituted in this manner has a large angle of view of the photographing optical system 41 in the wide-angle end, is small-sized, has a high zoom ratio and has an image forming performance stabilized in the whole zoom ratio region.

The present invention may be applied to not only a so-called compact digital camera that photographs a general subject as described above but also a monitor camera which requires a large angle of view and a lens interchangeable camera.

The above example of the zoom lens system is a satisfactorily compact zoom lens system having a high zoom ratio of, for example, about five to ten times, a high performance, and a half angle of view of, for example, about 35° in the wide-angle end.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom lens system comprising, in order from an object side:
 a first lens unit having a positive refractive power;
 a second lens unit having a negative refractive power;
 a third lens unit having a positive refractive power; and
 a fourth lens unit having a positive refractive power,
 during zooming from a wide-angle end to a telephoto end,
  at least the first lens unit and the third lens unit being moved toward the object side so as to increase a space between the first lens unit and the second lens unit and decrease a space between the second lens unit and the third lens unit,
 the following conditions being satisfied:

$$35° < \tan^{-1}(I/f_w) \quad (1);$$

$$5 < (f_t/f_w) \quad (2);$$

$$0.5 < f_{g1}/f_t < 1.35 \quad (3);$$

$$0.4 < |f_{g2}/f_{g3}| < 1 \quad (4); \text{ and}$$

$$0.5 < (M_{2gt}/M_{2gw})/(M_{3gt}/M_{3gw}) < 1.3 \quad (5),$$

in which $f_w$ is a focal length of the zoom lens system in the wide-angle end,
 $f_t$ is a focal length of the zoom lens system in the telephoto end,
 I is a maximum image height of a formed image,
 $f_{g1}$ is a focal length of the first lens unit,
 $f_{g2}$ is a focal length of the second lens unit,
 $f_{g3}$ is a focal length of the third lens unit,
 $M_{2gw}$ is a lateral magnification of the second lens unit in the wide-angle end,
 $M_{2gt}$ is a lateral magnification of the second lens unit in the telephoto end,
 $M_{3gw}$ is a lateral magnification of the third lens unit in the wide-angle end, and
 $M_{3gt}$ is a lateral magnification of the third lens unit in the telephoto end.

2. The zoom lens system according to claim 1, wherein the following condition is satisfied:

$$0.5 < C_{jt}/f_t < 1.8 \quad (6),$$

in which $C_{jt}$ is a distance from an incidence surface of the zoom lens system to an image position in the telephoto end along the optical axis.

3. The zoom lens system according to claim 2, wherein the first lens unit comprises, in order from the object side, a negative lens and a positive lens in which a curvature of the object-side surface is larger than that of the image-side surface, and
 the total number of the lenses of the first lens unit is two.

4. The zoom lens system according to claim 3, wherein the following condition is satisfied:

$$-1.5 < (R_{plf} + R_{plr})/(R_{plf} - R_{plr}) < -0.75 \quad (7),$$

in which $R_{plf}$ is a radius of curvature of an object-side surface of the positive lens of the first lens unit, and
 $R_{plr}$ is a radius of curvature of an image-side surface of the positive lens of the first lens unit.

5. The zoom lens system according to claim 4, wherein the second lens unit comprises, in order from the object side, a negative lens, a positive lens and a negative lens,
 the total number of the lenses of the second lens unit is three, and
 the negative lens of the second lens unit closest to the object side comprises at least one aspherical surface.

6. The zoom lens system according to claim 3, wherein the second lens unit comprises, in order from the object side, a negative lens, a positive lens and a negative lens,
 the total number of the lenses of the second lens unit is three, and
 the negative lens of the second lens unit closest to the object side comprises at least one aspherical surface.

7. The zoom lens system according to claim 2, wherein the first lens unit comprises a positive lens which satisfies the following condition:

$$-1.5 < (R_{plf} + R_{plr})/(R_{plf} - R_{plr}) < -0.75 \quad (7),$$

in which $R_{plf}$ is a radius of curvature of an object-side surface of the positive lens of the first lens unit, and
 $R_{plr}$ is a radius of curvature of an image-side surface of the positive lens of the first lens unit.

8. The zoom lens system according to claim 7, wherein the second lens unit comprises, in order from the object side, a negative lens, a positive lens and a negative lens,
 the total number of the lenses of the second lens unit is three, and
 the negative lens of the second lens unit closest to the object side comprises at least one aspherical surface.

9. The zoom lens system according to claim 2, wherein the second lens unit comprises, in order from the object side, a negative lens, a positive lens and a negative lens,
 the total number of the lenses of the second lens unit is three, and
 the negative lens of the second lens unit closest to the object side comprises at least one aspherical surface.

10. The zoom lens system according to claim 1, wherein the first lens unit comprises, in order from the object side, a negative lens and a positive lens in which a curvature of the object-side surface is larger than that of the image-side surface, and
 the total number of the lenses of the first lens unit is two.

11. The zoom lens system according to claim 10, wherein the following condition is satisfied:

$$-1.5 < (R_{plf} + R_{plr})/(R_{plf} - R_{plr}) < -0.75 \quad (7),$$

in which $R_{plf}$ is a radius of curvature of an object-side surface of the positive lens of the first lens unit, and $R_{plr}$ is a radius of curvature of an image-side surface of the positive lens of the first lens unit.

12. The zoom lens system according to claim 11, wherein the second lens unit comprises, in order from the object side, a negative lens, a positive lens and a negative lens, the total number of the lenses of the second lens unit is three, and the negative lens of the second lens unit closest to the object side comprises at least one aspherical surface.

13. The zoom lens system according to claim 10, wherein the second lens unit comprises, in order from the object side, a negative lens, a positive lens and a negative lens, the total number of the lenses of the second lens unit is three, and the negative lens of the second lens unit closest to the object side comprises at least one aspherical surface.

14. The zoom lens system according to claim 1, wherein the first lens unit comprises a positive lens which satisfies the following condition:

$$-1.5<(R_{plf}+R_{plr})/(R_{plf}-R_{plr})<-0.75 \quad (7),$$

in which $R_{plf}$ is a radius of curvature of the object-side surface of the positive lens of the first lens unit, and $R_{plr}$ is a radius of curvature of the image-side surface of the positive lens of the first lens unit.

15. The zoom lens system according to claim 14, wherein the second lens unit comprises, in order from the object side, a negative lens, a positive lens and a negative lens, the total number of the lenses of the second lens unit is three, and the negative lens of the second lens unit closest to the object side comprises at least one aspherical surface.

16. The zoom lens system according to claim 1, wherein the second lens unit comprises, in order from the object side, a negative lens, a positive lens and a negative lens, the total number of the lenses of the second lens unit is three, and the negative lens of the second lens unit closest to the object side comprises at least one aspherical surface.

17. An image pickup apparatus comprising:

the zoom lens system according to claim 1; and an image pickup device which is disposed on an image side of the zoom lens system and which converts an optical image into an electric signal.

18. The image pickup apparatus according to claim 17, further comprising:

a low pass filter arranged between the zoom lens system and the image pickup device.

19. A zoom lens system comprising, in order from an object side:

a first lens unit having a positive refractive power;

a second lens unit having a negative refractive power;

a third lens unit having a positive refractive power; and a fourth lens unit having a positive refractive power, during zooming from a wide-angle end to a telephoto end, at least the first lens unit and the third lens unit being moved toward the object side so as to increase a space between the first lens unit and the second lens unit and decrease a space between the second lens unit and the third lens unit, the first lens unit comprising, in order from the object side, a negative lens and a positive lens in which a curvature of the object-side surface is larger than that of an image-side surface, the total number of the lenses of the first lens unit being two, the following conditions being satisfied:

$$35°<\tan^{-1}(I/f_w) \quad (1);$$

$$5<(f_t/f_w) \quad (2);$$

$$0.5<f_{g1}/f_t<1.35 \quad (3); \text{ and}$$

$$-1.5<(R_{plf}+R_{plr})/(R_{plf}-R_{plr})<-0.75 \quad (7),$$

in which $f_w$ is a focal length of the zoom lens system in the wide-angle end, $f_t$ is a focal length of the whole zoom lens system in the telephoto end, I is a maximum image height of a formed image, $f_{g1}$ is a focal length of the first lens unit, $R_{plf}$ is a radius of curvature of an object-side surface of the positive lens of the first lens unit, and $R_{plr}$ is a radius of curvature of an image-side surface of the positive lens of the first lens unit.

20. The zoom lens system according to claim 19, wherein the following conditions are satisfied:

$$0.4<|f_{g2}/f_{g3}|<1 \quad (4); \text{ and}$$

$$0.5<(M_{2gt}/M_{2gw})/(M_{3gt}/M_{3gw})<1.3 \quad (5),$$

in which $f_{g2}$ is a focal length of the second lens unit, $f_{g3}$ is a focal length of the third lens unit, $M_{2gw}$ is a lateral magnification of the second lens unit in the wide-angle end, $M_{2gt}$ is a lateral magnification of the second lens unit in the telephoto end, $M_{3gw}$ is a lateral magnification of the third lens unit in the wide-angle end, and $M_{3gt}$ is a lateral magnification of the third lens unit in the telephoto end.

21. The zoom lens system according to claim 20, wherein the following condition is satisfied:

$$0.5<C_{jt}/f_t<1.8 \quad (6),$$

in which $C_{jt}$ is a distance from an incidence surface of the zoom lens system to an image position in the telephoto end along the optical axis.

22. The zoom lens system according to claim 21, wherein the second lens unit comprises, in order from the object side, a negative lens, a positive lens and a negative lens, the total number of the lenses of the second lens unit is three, and the negative lens of the second lens unit closest to the object side comprises at least one aspherical surface.

23. The zoom lens system according to claim 20, wherein the second lens unit comprises, in order from the object side, a negative lens, a positive lens and a negative lens, the total number of the lenses of the second lens unit is three, and the negative lens of the second lens unit closest to the object side comprises at least one aspherical surface.

24. The zoom lens system according to claim 19, wherein the following condition is satisfied:

$$0.5<C_{jt}/f_t<1.8 \quad (6),$$

in which $C_{jt}$ is a distance from an incidence surface of the zoom lens system to an image position in the telephoto end along the optical axis.

25. The zoom lens system according to claim 19, wherein the second lens unit comprises, in order from the object side, a negative lens, a positive lens and a negative lens, the total number of the lenses of the second lens unit is three, and the negative lens of the second lens unit closest to the object side comprises at least one aspherical surface.

26. The zoom lens system according to claim 24, wherein the second lens unit comprises, in order from the object side, a negative lens, a positive lens and a negative lens, the total number of the lenses of the second lens unit is three, and the negative lens of the second lens unit closest to the object side comprises at least one aspherical surface.

* * * * *